US007553231B2

(12) United States Patent
Rodgers et al.

(10) Patent No.: US 7,553,231 B2
(45) Date of Patent: Jun. 30, 2009

(54) GAMING DEVICE HAVING GAME WITH CASCADING WILD SYMBOLS

(75) Inventors: Paulina Rodgers, Reno, NV (US); Wing Yee Ngan, Reno, NV (US)

(73) Assignee: IGT, Reno, NV (US)

( * ) Notice: Subject to any disclaimer, the term of this patent is extended or adjusted under 35 U.S.C. 154(b) by 399 days.

(21) Appl. No.: 11/223,155

(22) Filed: Sep. 9, 2005

(65) Prior Publication Data

US 2007/0060248 A1 Mar. 15, 2007

(51) Int. Cl.
*A63F 13/00* (2006.01)

(52) U.S. Cl. .............................. 463/20; 463/21; 463/16

(58) Field of Classification Search .................. 463/20, 463/16, 21

See application file for complete search history.

(56) References Cited

U.S. PATENT DOCUMENTS

| | | | |
|---|---|---|---|
| 1,978,395 | A | 10/1934 | Groetchen |
| 3,420,525 | A | 1/1969 | Waders |
| 3,642,287 | A | 2/1972 | Lally et al. |
| 3,735,987 | A | 5/1973 | Ohki |
| 4,198,052 | A | 4/1980 | Gauselmann |
| 4,326,351 | A | 4/1982 | Heywood et al. |
| 4,695,053 | A | 9/1987 | Vazquez, Jr. et al. |
| 5,152,529 | A | 10/1992 | Okada |
| 5,308,065 | A | 5/1994 | Bridgeman et al. |
| 5,332,228 | A | 7/1994 | Schultz |
| 5,364,100 | A | 11/1994 | Ludlow et al. |
| 5,395,111 | A | 3/1995 | Inoue |
| 5,423,539 | A | 6/1995 | Nagao |
| 5,431,408 | A | 7/1995 | Adams |
| 5,449,173 | A | 9/1995 | Thomas et al. |
| 5,584,764 | A | 12/1996 | Inoue |

(Continued)

FOREIGN PATENT DOCUMENTS

| | | |
|---|---|---|
| AU | 199717601 B2 | 9/1997 |
| AU | 722969 | 6/1998 |
| AU | 199917318 A1 | 9/1999 |
| EP | 1 184 822 | 7/1982 |
| EP | 0 060 019 | 9/1982 |
| EP | 0 874 337 | 10/1998 |
| EP | 0 981 119 | 2/2000 |
| EP | 0 984 408 | 3/2000 |
| EP | 1 205 894 | 10/2001 |

(Continued)

OTHER PUBLICATIONS

Barn Yard Article, written by Strictly Slots, Aristocrat Technology, published Mar. 2002.

(Continued)

*Primary Examiner*—Dmitry Suhol
*Assistant Examiner*—Thomas H Henry
(74) *Attorney, Agent, or Firm*—K&L Gates, LLP

(57) ABSTRACT

Gaming devices and methods of operating gaming devices are provided. In an embodiment, a single activation of a gaming device can cause a series of outcomes including a symbol cascading effect upon the occurrence of sequential triggering events. In an embodiment, the triggering event occurs when a predetermined combination of symbols is generated and displayed in associated symbol positions, and a designated symbol is generated and displayed in at least one symbol position. If the triggering event occurs, the outcome can include fixing or locking the designated symbol in the symbol position and replacing each of the symbols in the combination of symbols with a generated symbol. Awards are provided for each winning combination, and an incremented modifier is applied to the awards for the occurrence of at least one triggering event. The likelihood that the triggering event will occur increases with each designated symbol fixed in a symbol position.

59 Claims, 32 Drawing Sheets

U.S. PATENT DOCUMENTS

| | | | |
|---|---|---|---|
| 5,664,998 | A | 9/1997 | Seelig et al. |
| 5,752,881 | A | 5/1998 | Inoue |
| 5,769,716 | A | 6/1998 | Saffari et al. |
| 5,772,506 | A | 6/1998 | Marks et al. |
| 5,823,873 | A | 10/1998 | Moody |
| 5,833,536 | A | 11/1998 | Davids et al. |
| 5,833,537 | A | 11/1998 | Barrie |
| 5,984,782 | A | 11/1999 | Innoue |
| 5,997,400 | A | 12/1999 | Seelig et al. |
| 5,997,401 | A | 12/1999 | Crawford |
| 6,033,307 | A | 3/2000 | Vancura |
| 6,056,642 | A | 5/2000 | Bennett |
| 6,059,289 | A | 5/2000 | Vancura |
| 6,086,066 | A | 7/2000 | Tekeuchi et al. |
| 6,089,976 | A | 7/2000 | Schneider et al. |
| 6,089,977 | A | 7/2000 | Bennett |
| 6,120,031 | A | 9/2000 | Adams |
| 6,120,376 | A | 9/2000 | Cherry |
| 6,142,875 | A | 11/2000 | Kodachi et al. |
| 6,159,095 | A | 12/2000 | Frohm et al. |
| 6,159,096 | A | 12/2000 | Yoseloff |
| 6,190,254 | B1 | 2/2001 | Bennett |
| 6,220,959 | B1 | 4/2001 | Holmes, Jr. et al. |
| 6,251,013 | B1 | 6/2001 | Bennett |
| 6,270,411 | B1 | 8/2001 | Gura et al. |
| 6,290,600 | B1 | 9/2001 | Glasson |
| 6,299,165 | B1 | 10/2001 | Nagano |
| 6,299,170 | B1 | 10/2001 | Yoseloff |
| 6,305,686 | B1 | 10/2001 | Perrie et al. |
| 6,311,976 | B1 | 11/2001 | Yoseloff et al. |
| 6,315,289 | B1 | 11/2001 | Sakamoto |
| 6,315,663 | B1 | 11/2001 | Sakamoto |
| 6,319,124 | B1 | 11/2001 | Baerlocher et al. |
| 6,322,078 | B1 | 11/2001 | Adams |
| 6,358,144 | B1 | 3/2002 | Kaddlic et al. |
| 6,394,902 | B1 | 5/2002 | Glavich et al. |
| 6,413,162 | B1 | 7/2002 | Baerlocher et al. |
| 6,419,579 | B1 | 7/2002 | Bennett |
| 6,439,993 | B1 | 8/2002 | O'Halloran |
| 6,481,713 | B2 | 11/2002 | Perrie et al. |
| 6,494,454 | B2 | 12/2002 | Adams |
| 6,589,114 | B2 | 7/2003 | Rose |
| 6,604,740 | B1 | 8/2003 | Singer et al. |
| 6,616,142 | B2 | 9/2003 | Adams |
| 6,659,864 | B2 | 12/2003 | McGahn et al. |
| 6,676,512 | B2 | 1/2004 | Fong et al. |
| 6,780,109 | B2 | 8/2004 | Kaminkow |
| 6,805,349 | B2 | 10/2004 | Baerlocher et al. |
| 6,837,788 | B2 | 1/2005 | Cannon |
| 6,866,583 | B2 | 3/2005 | Glavich et al. |
| 6,905,406 | B2 | 6/2005 | Kaminkow et al. |
| 6,910,962 | B2 | 6/2005 | Marks et al. |
| 6,921,335 | B2 | 7/2005 | Rodgers et al. |
| 7,226,359 | B2 | 6/2007 | Bussick et al. |
| 2002/0010017 | A1 | 1/2002 | Bennett |
| 2002/0068623 | A1 * | 6/2002 | Gauselmann ................ 463/20 |
| 2003/0157981 | A1 | 8/2003 | Marks et al. |
| 2003/0203753 | A1 | 10/2003 | Muir et al. |
| 2003/0207710 | A1 | 11/2003 | Rodgers et al. |
| 2004/0012145 | A1 | 1/2004 | Inoue |
| 2004/0014516 | A1 | 1/2004 | Inoue |
| 2004/0014517 | A1 | 1/2004 | Inoue |
| 2004/0018866 | A1 | 1/2004 | Inoue |
| 2004/0026854 | A1 | 2/2004 | Inoue |
| 2004/0036218 | A1 | 2/2004 | Inoue |
| 2004/0038726 | A1 | 2/2004 | Inoue |
| 2004/0043809 | A1 | 3/2004 | Gomez et al. |
| 2004/0053669 | A1 | 3/2004 | Gerrard et al. |
| 2004/0053672 | A1 | 3/2004 | Baerlocher |
| 2004/0053676 | A1 | 3/2004 | Rodgers |
| 2004/0072612 | A1 | 4/2004 | Rodgers et al. |
| 2004/0097280 | A1 | 5/2004 | Gauselmann |
| 2004/0137982 | A1 | 7/2004 | Cuddy et al. |
| 2004/0147306 | A1 | 7/2004 | Randall et al. |
| 2005/0020344 | A1 | 1/2005 | Kaminkow |
| 2005/0049035 | A1 | 3/2005 | Baerlocher et al. |
| 2005/0064924 | A1 | 3/2005 | Glavich et al. |
| 2005/0070354 | A1 | 3/2005 | Baerlocher et al. |
| 2005/0101380 | A1 | 5/2005 | Glavich et al. |
| 2005/0148384 | A1 | 7/2005 | Marks et al. |
| 2005/0227754 | A1 | 10/2005 | Kaminkow et al. |
| 2008/0051174 | A1 | 2/2008 | Fiden |

FOREIGN PATENT DOCUMENTS

| | | | |
|---|---|---|---|
| EP | 1 422 673 | | 5/2004 |
| EP | 1 513 117 | | 3/2005 |
| GB | 2 081 952 | | 2/1982 |
| GB | 2 090 690 | | 7/1982 |
| GB | 2 096 376 | | 10/1982 |
| GB | 2 097 160 | | 10/1982 |
| GB | 2 100 905 | | 1/1983 |
| GB | 2 105 891 | | 3/1983 |
| GB | 2 113 881 | | 8/1983 |
| GB | 2 117 155 | | 10/1983 |
| GB | 2 137 392 | | 10/1984 |
| GB | 2 161 008 | | 1/1986 |
| GB | 2 165 385 | A | 4/1986 |
| GB | 2 170 643 | | 8/1986 |
| GB | 2 180 087 | A | 3/1987 |
| GB | 2 181 589 | | 4/1987 |
| GB | 2 183 882 | | 6/1987 |
| GB | 2 191 030 | | 12/1987 |
| GB | 2 222 712 | | 3/1990 |
| GB | 2 225 889 | | 6/1990 |
| GB | 2 226 436 | | 6/1990 |
| GB | 2 242 300 | | 9/1991 |
| GB | 2 262 642 | | 6/1993 |
| GB | 2 322 217 | A | 8/1998 |
| GB | 2 335 524 | A | 9/1999 |
| GB | 2 393 555 | A | 3/2004 |
| WO | WO 9732285 | | 9/1997 |
| WO | WO 00/32286 | | 6/2000 |
| WO | WO 00/66235 | | 11/2000 |
| WO | WO 00/76606 | | 12/2000 |
| WO | WO 01/26019 | | 4/2001 |
| WO | WO 03/026756 | | 4/2003 |
| WO | WO 2004/025584 | | 3/2004 |
| WO | 2006/076294 | A2 | 7/2006 |
| WO | 2007/002935 | A2 | 1/2007 |
| WO | 2007/130444 | A2 | 11/2007 |

OTHER PUBLICATIONS

Bejeweled Web page, written by PopCap Games, http://www.popcap.com, published prior to Sep. 9, 2005.

Black Swan Paytable Display written by IGT, published prior to 2001.

Break the Spell Advertisement written by Atronic Casino Technology, Ltd., published in 1999.

Cash Chameleon Article written by Strictly Slots/Aristocrat Leisure Industries, PTY Ltd., published in Apr. 2001.

Catch A Wave Advertisement written by IGT, published in Dec. 2000.

Cossack Dance Advertisement written by Olympic Video Gaming, published prior to 2002.

Description of Expanding Symbol, written by IGT, published Sep. 1999.

Description of Gaming Machine with Animating Symbols, written by IGT, published Jan. 2000.

Description of Symbol Feature in Australian UFO Gaming Machine, written by Barcrest, Ltd., published 1995.

Description of Traveling Symbols, written by IGT, published Sep. 1999.

Double Diamond Line Advertisement written by Bally Gaming Systems, published in 2000.

Easy Street Advertisements and Articles, written by Casino Data Systems, published in 2000.
Enchanted Forest™ Gaming Description from Aristocrat, available in 1994.
Enchanted Unicorn Advertisement written by IGT, published in 2001.
Fishin' Buddies Article published in Strictly Slots/Anchor Games, published in Apr. 2001.
Ghoulish Gamble Article, written by Strictly Slots, IGT, Sep. 2000.
Gold Fever Advertisement, written by Atronic Casino Technology, Ltd., published 1999.
Gold Fever Atronic Web page, written by Atronic Casino Technology, published Mar. 2002.
Goooaal! pp. 1-2, written by Bally Gaming, Inc., published Dec. 2000.
Jewel in the Crown Adverstisements, written by Barcrest Ltd., published 1999.
Joker's Wild Advertisement written by IGT, published prior to 2001.
Kaboom Web page, written by WMS Gaming, http://www.wmsgaming.com/products/video/kaboom/index.php, published prior to Sep. 9, 2005.
Loco Loot Article written by Strictly Slots/Aristocrat Leisure Industries, PTY Ltd., published in May 2002.
Marshall Fey, Slot Machines a pictorial History of the First 100 Years, Liberty Bell Books, pp. 79, 150, 171, 231, published 1983.
Mountain Money Article written by Strictly Slots/Aristocrat Leisure Industries, PTY Ltd., published in Jun. 2002.
Mystery Mine Advertisement, Konami Australia Pty. Ltd., published Jan. 1999.
On the House Advertisement written by Olympic Video Gaming, published prior to 2002.
Penguin Pays Advertisement written by Aristocrat Incorporated, published in 1998.
Reel Magic™ Gaming Machine Description written by IGT, available in 1986.
South Park Advertisement, written by IGT, published Sep. 1999.
Wild Bear Salmon Run Advertisement written by IGT, published in 2003.
Wild Streak Advertisement written by WMS Gaming, Inc., published in 2001.
Your Real Key to Gaming Success Advertisement (including Roll Over Beethoven and Wild Fortune) written by Olympic Video Gaming, published date unknown.

* cited by examiner 16,18

Paytable

| Symbol Combination | Credits | Symbol Combination | Credits | Symbol Combination | Credits | Symbol Combination | Credits |
|---|---|---|---|---|---|---|---|
| AAAAA | 5 | EEEEE | 25 | IIIII | 45 | MMMMM | 65 |
| BBBBB | 10 | FFFFF | 30 | JJJJJ | 50 | NNNNN | 70 |
| CCCCC | 15 | GGGGG | 35 | KKKKK | 55 | OOOOO | 75 |
| DDDDD | 20 | HHHHH | 40 | LLLLL | 60 | PPPPP | 100 |

Fig. 3B 16,18

Table: Incremental Multiplier with Occurrence of Triggering Event

| Occurrence of Triggering Event | Multiplier | Occurrence of Triggering Event | Multiplier | Occurrence of Triggering Event | Multiplier | Occurrence of Triggering Event | Multiplier |
|---|---|---|---|---|---|---|---|
| 1st | 1x | 5th | 5x | 9th | 9x | 13th | 20x |
| 2nd | 2x | 6th | 6x | 10th | 10x | 14th | 25x |
| 3rd | 3x | 7th | 7x | 11th | 12x | 15th | 50x |
| 4th | 4x | 8th | 8x | 12th | 15x | 16th | 100x |

Fig. 3C

GAMING DEVICE HAVING GAME WITH CASCADING WILD SYMBOLS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

The present disclosure relates in general to gaming devices and methods of operating gaming devices, and more particularly to gaming devices and methods which include a triggering event which can recur without an input from the player and which has an increased probability of recurring with at least one occurrence.

To increase player enjoyment and excitement, and to increase the popularity of gaming machines, gaming device manufacturers constantly strive to provide players with new types of gaming machines that attract the player and keep the player entertained. To this end, gaming machine manufacturers attempt to provide more opportunities for the player to win and enhance the awards associated with those award opportunities.

Many gaming devices initiate a single generation and display of symbols in response to a wager by a player. For example, certain gaming machines employ a plurality of reels, wherein the reels each have a plurality of symbols, and enable a player to place a wager on one or more paylines associated with symbol positions. The symbols on the reels are independently generated to provide a combination of symbols. A single activation of the set of reels typically leads to a single display of symbols arranged along the paylines to be evaluated for any award. If a winning symbol or winning combination of symbols is generated and displayed along a wagered on payline, an award is provided to the player, and the game ends. If a winning symbol or combination of symbols is not generated and displayed along a wagered on payline, no award is provided to the player for that payline.

Improvements to gaming devices have been known to include outcomes that allow additional play of a game without an additional wager or input by the player. For example, some gaming machines provide additional award opportunities to players without requiring an additional wager in the form of free spins or activations. Upon winning free spins, the reels can automatically generate a number of outcomes and provide the player credits from winning symbols or symbol combinations occurring in the outcomes.

Other gaming machines provide additional award opportunities through the occurrence of a triggering event which enables the player to activate the same game or a different game, such as a bonus game. This automatic extended play of the same or different game by the gaming device is often limited to a single additional award opportunity.

Another feature that is sometimes used to provide a player with an additional opportunity to obtain winning symbol combinations is a wild symbol. Known gaming devices provide wild symbols that can enable the matching of symbols along a payline to achieve a winning combination by acting or substituting as any other possible symbol for purposes of determining a winning combination.

In addition to increasing the number of award opportunities in a game, gaming machine manufacturers attempt to enhance the awards associated with those award opportunities. Conventional gaming devices employ different components to enhance a player's outcome in a game. One such component is a modifier. A modifier such as a multiplier enables players to obtain larger outcomes such as larger awards in a game. A multiplier increases the award amount proportionally to the value of the multiplier. For example, a "2×" multiplier pays twice the normal award value. A "3×" multiplier pays three times the normal award value. Therefore, a multiplier can substantially enhance a player's award.

Gaming device manufacturers strive to make gaming devices that provide as much enjoyment and excitement as possible. Providing a game in which a player has multiple opportunities to win an award and potentially large awards or credits are ways to enhance player enjoyment and excitement. Players are also attracted to gaming devices which provide new game schemes and interactive features including different ways of enhancing awards associated with winning symbol combinations or different types of triggering events. Therefore, to increase player enjoyment and excitement, it is desirable to provide players with new game schemes and features for gaming devices which include new and different ways of providing additional award opportunities and enhancing the awards provided to the players in a game. A continuing need thus exists to provide new and exciting gaming devices and methods.

SUMMARY

The present disclosure relates to gaming devices and methods of operating a gaming device. In particular, the disclosure provides gaming devices and methods of operating a gaming device wherein additional award opportunities include fixing designated symbols in symbol positions and replacing associated symbols or symbols displayed in associated symbol positions upon the occurrence of at least one symbol replacement triggering event in a game. The symbols are replaced until the triggering event no longer occurs or is no longer able to occur. In addition, the gaming devices and methods include enhancing awards upon the occurrence of the triggering event.

For example, in an embodiment, the gaming device includes a plurality of reels and a plurality of symbols displayed in association with the reels. In an embodiment, the plurality of symbols are displayed on independent reels such as the independent reels described in U.S. Pat. No. 6,413,162. In such an embodiment, an independent reel is associated with each of a plurality of symbol positions. A player activates one or more paylines by placing a wager on the paylines. The gaming device generates symbols to be displayed on each of the reels. The gaming device determines if any winning combinations of symbols are displayed on the reels in association with the wagered on paylines. The gaming device provides any awards to the player for any of the winning combinations. In addition, the gaming device determines if a triggering event has occurred.

In an embodiment, the triggering event includes symbols associated as a winning combination of symbols. In an embodiment, the winning combination of symbols includes a plurality of symbols displayed in at least two of a plurality of symbol positions associated by a payline. It should be appreciated that the winning combination of symbols may include any suitable number of symbols displayed in symbol positions of a plurality of associated symbol positions.

In an embodiment, the triggering event also includes a designated symbol, such as a wild symbol, generated and displayed in a symbol position by the gaming device.

The occurrence of the triggering event causes the wild symbol to remain displayed, and at least one of the symbols of the winning combination of symbols to be replaced with generated symbols. If another winning combination of symbols is formed from the generated replacement symbols and a new or replacement wild symbol is generated by the gaming device, the subsequently generated wild symbol remains fixed along with the originally generated wild symbol, and at least one of the symbols of the winning combination are again replaced. The replacement of symbols upon the occurrence of the triggering event continues until the triggering event does not occur or until all symbols have been replaced with a designated symbol such as a wild symbol.

In an embodiment, the likelihood the triggering event will occur increases with each occurrence of the triggering event. In an embodiment, the probability of the triggering event recurring is increased after the occurrence of the triggering event by requiring at least two conditions to be satisfied for the triggering event to occur. In an embodiment, the satisfaction of at least the first condition increases the likelihood that the second condition will be satisfied to increase the probability that the triggering event will recur. For example, in an embodiment, for a triggering event to occur, a winning combination of symbols must be generated and displayed along an activated payline, and a designated symbol, such as a wild symbol, must be generated and displayed. Upon the occurrence of the triggering event, the wild symbol is locked, and the symbols of the winning combination are re-generated to provide the player another opportunity for a triggering event to occur. A guaranteed or locked wild symbol from the previous occurrence of the triggering event can substitute or act as any symbol for purposes of completing a winning symbol combination. Therefore, the condition of generating a wild symbol contributes to the satisfaction of the condition of generating a winning combination, thereby increasing the likelihood the triggering event will recur in at least one instance.

In an alternative embodiment, the triggering event includes a winning combination of symbols generated by a gaming device on a payline wherein at least one of the symbols of the winning combination includes a designated symbol, such as a wild symbol. The occurrence of the triggering event causes the wild symbol to remain displayed and at least one of the symbols of the winning combination of symbols to be replaced. If another winning combination is formed from the resulting replacement symbols and any of the replaced symbols include a wild symbol, the subsequently generated wild symbol remains fixed along with the originally generated wild symbol, and at least one of the other symbols of the winning combination is again replaced. The replacement of symbols upon the occurrence of the triggering event continues until the triggering event does not occur or until all symbols have been replaced with the wild symbol.

In an embodiment, only the symbols in the winning combination of symbols that includes the designated symbol are replaced upon each occurrence of the triggering event. For example, if a wild symbol and winning combination of symbols are generated and displayed in a first set of symbol positions, the wild symbol is locked or fixed in its symbol position, and the symbols of the winning combination in the first set of symbol positions are replaced. If a wild symbol and winning combination of symbols are generated and displayed in a second set of symbol positions, the wild symbol is locked or fixed in its symbol position, and the symbols of the winning combination in the second set of symbol positions are replaced. However, the symbols of the winning combination in the first set of symbol positions are not replaced. Alternatively, each of the non-designated or non-wild symbols associated with winning combinations in earlier symbol generations continue to be replaced upon each occurrence of the triggering event. Therefore, in the example described above, both the symbols of the winning combination in the second set of symbol positions and the symbols of the winning combination in the first set of symbol positions are replaced.

In an embodiment, an incremental award is provided to the player for each occurrence of the symbol replacement triggering event, such as the generation of a designated symbol associated with a winning combination along an activated payline. In an embodiment, the award corresponding to a winning combination of symbols is modified by a modifier such as a multiplier. In an embodiment, the modifier is increased incrementally upon each occurrence of the triggering event. In addition, a bonus award can be provided to the player if a predetermined number of triggering events occur or a predetermined number of designated symbols are generated.

It should be appreciated that this symbol replacement scheme can proceed automatically without any input by the player through a continuous series of replacements or re-generations of symbols to create a visual cascading effect of wild symbols appearing to fill the symbol positions until the triggering event no longer occurs. In addition, this symbol replacement scheme can provide an exciting display of multiple award opportunities as well as increasing awards as the gaming device accumulates and modifies the awards associated with repeated triggering events and winning combinations.

It is, therefore, an advantage of the present apparatus and method to provide multiple symbol replacements with a single player input.

Another advantage of the present apparatus and method includes creating a visual effect in displaying symbols.

An additional advantage of the present apparatus and methods includes causing a series of outcomes to be provided to a player upon the occurrence of sequential triggering events.

A further advantage of the present apparatus and methods includes a series of winning outcomes with potentially increasing award values.

An additional advantage of the present apparatus and methods includes extending the play of a game.

Another advantage of the present apparatus and methods includes providing alternative ways of winning an award.

A further advantage of the present apparatus and methods includes increasing the probability of a subsequent occurrence of a triggering event with each occurrence of the triggering event.

An even further advantage of the present apparatus and methods includes providing an award to a player for winning combinations of symbols displayed on more paylines than the number of paylines wagered upon.

Additional features and advantages are described herein, and will be apparent from, the following Detailed Description and the Figures.

BRIEF DESCRIPTION OF THE FIGURES

FIG. 3B is an elevation view of a display device illustrating an example of a pay table in an embodiment of the gaming device.

FIG. 3C is an elevation view of a display device illustrating the display of an example of a table listing the incremental multipliers associated with each occurrence of a triggering event in an embodiment of the gaming device.

DETAILED DESCRIPTION

Gaming Device Electronics

Figure 1A:
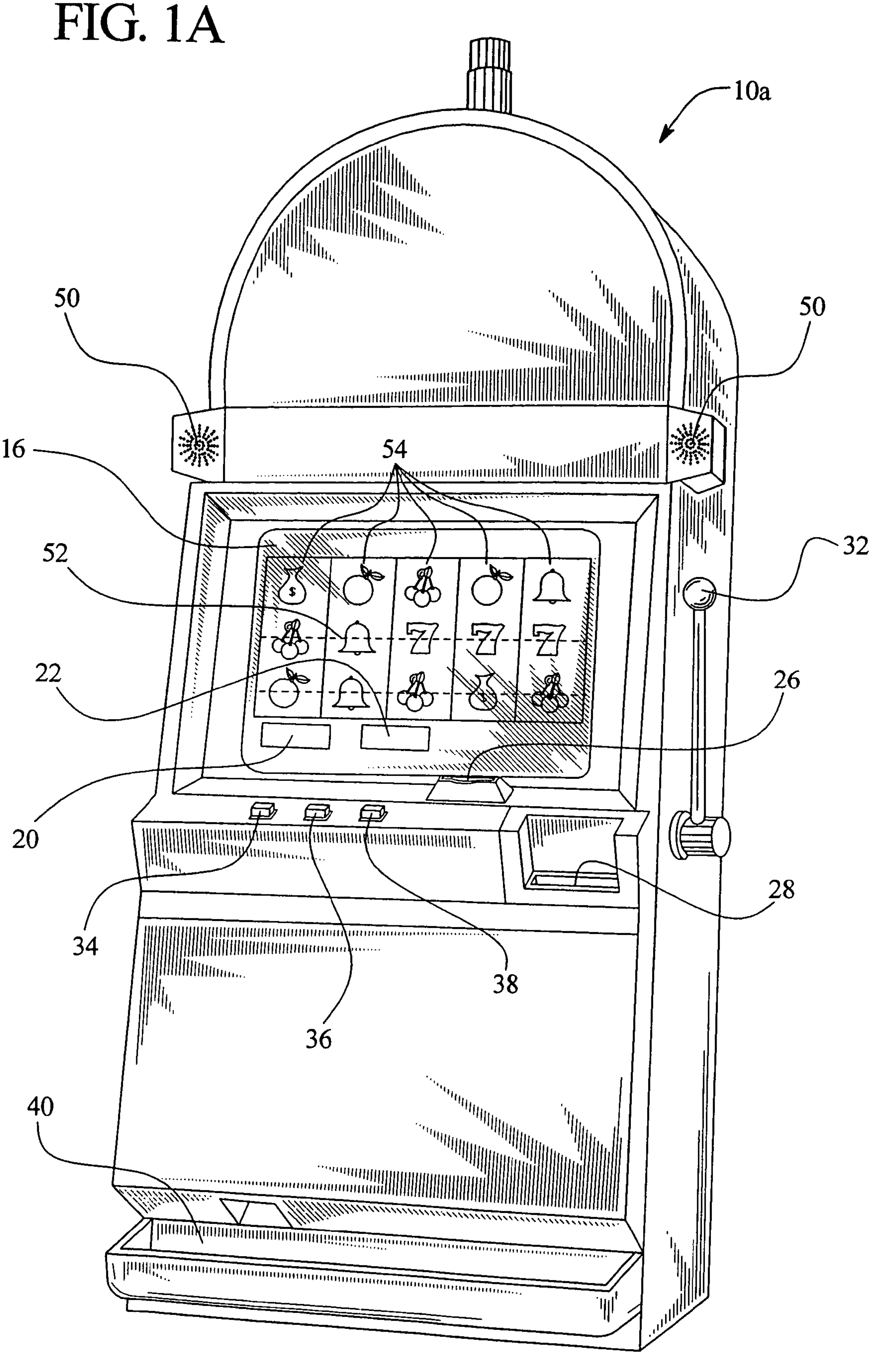
FIGS. 1A and 1B are front perspective views of various embodiments of a slot machine embodiment of a gaming device.
Figure 1B:
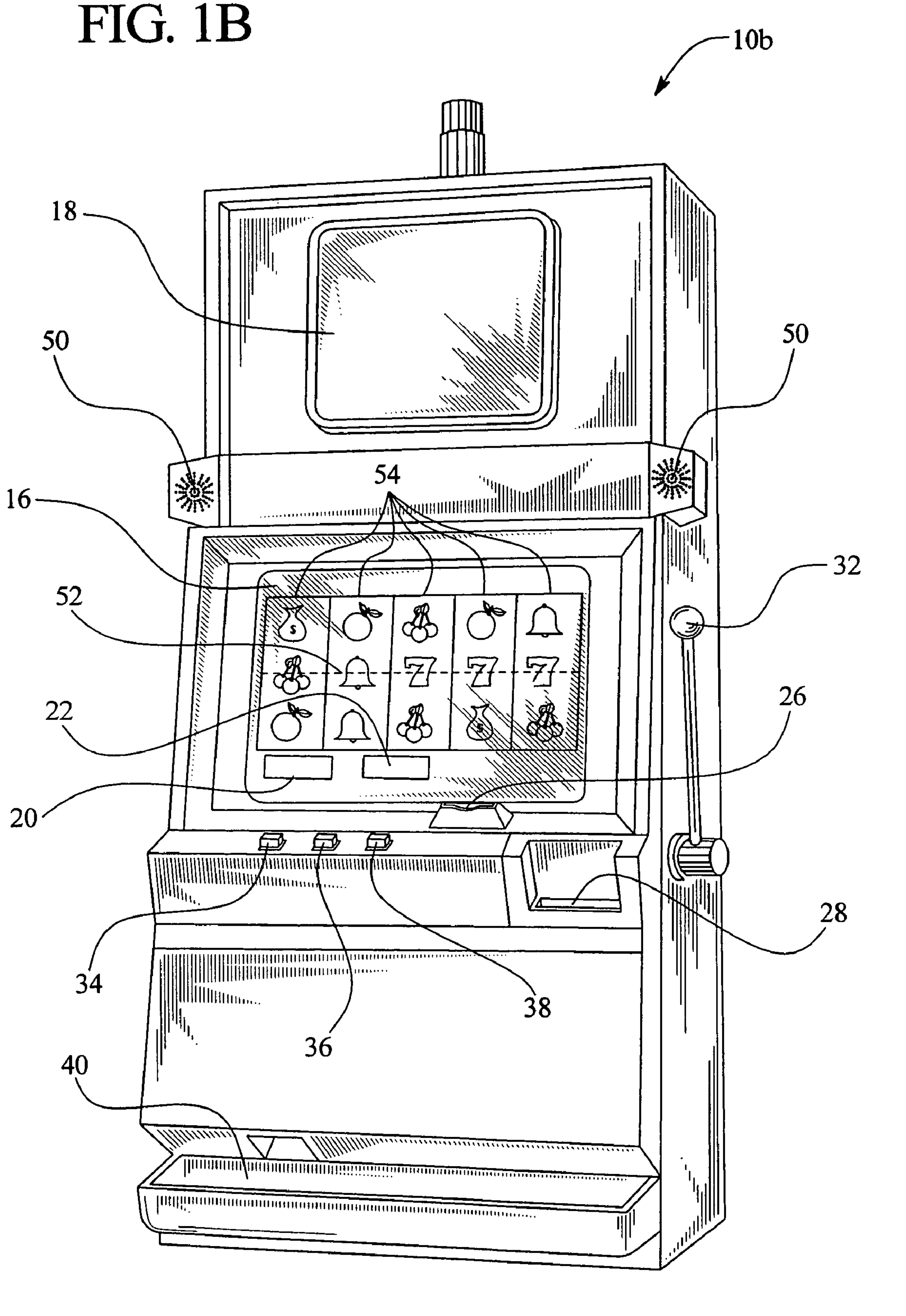

Referring now to the drawings, two alternative embodiments of the gaming device are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
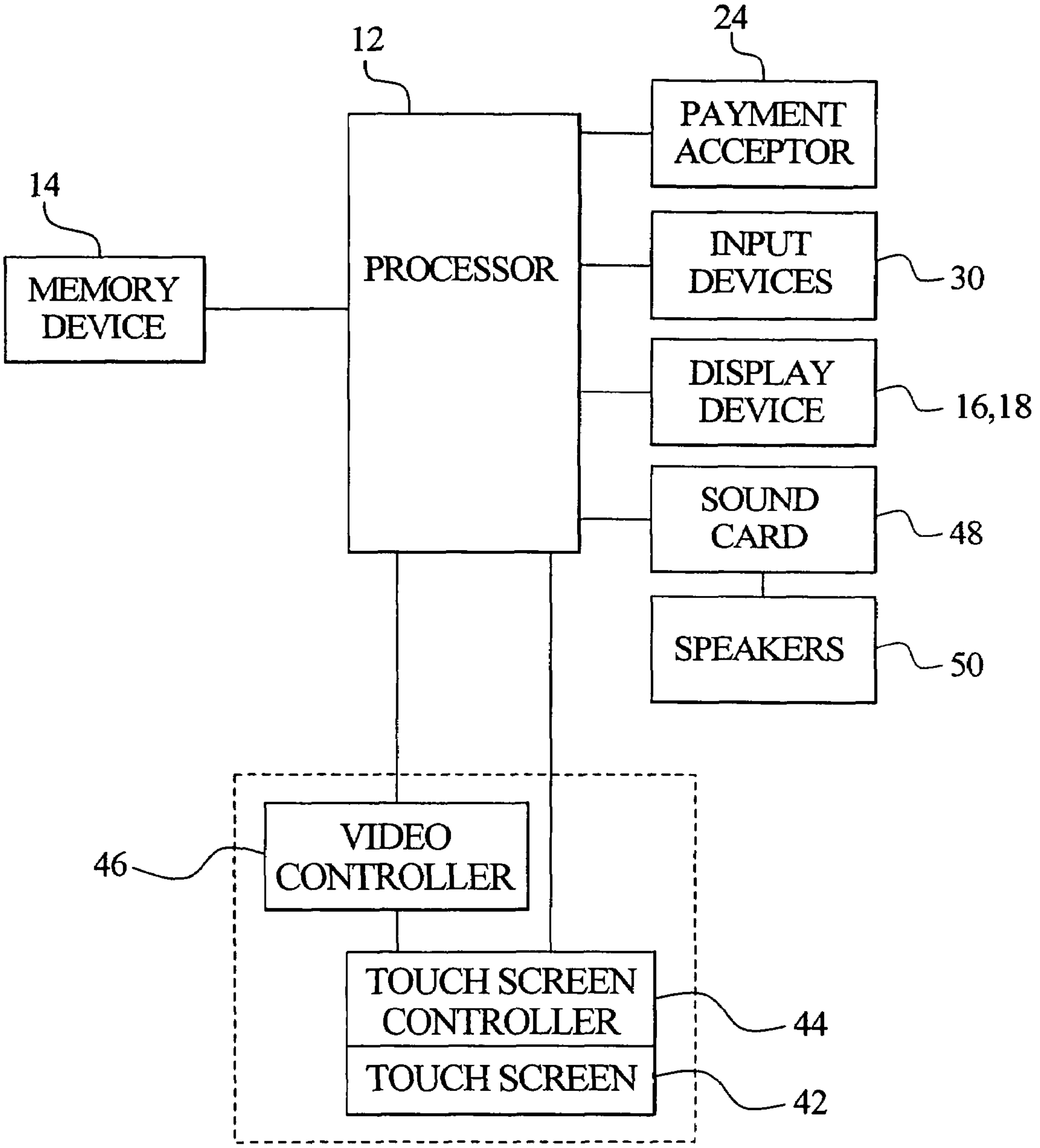
FIG. 2A is a schematic block diagram of the electronic configuration of one embodiment of a gaming device.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the art. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome. Such random determination could be provided through utilization of a random number generator (RNG) or other suitable randomization process.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses. In another embodiment, upon a player initiating game play at the gaming device, the gaming device enrolls in a bingo game. In this embodiment, a bingo server calls the bingo balls that result in a specific game outcome. The resultant game outcome is communicated to the individual gaming device to be provided to a player.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. In another embodiment, at least one display device may be a mobile display device, such as a PDA or tablet PC, that enables play of at least a portion of the primary or secondary game at a location remote from the gaming device. As seen in FIGS. 1A and 1B, in one embodiment, the gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display including a projected and/or reflected image or any other suitable electronic device or display mechanism. In one embodiment, as described in more detail below, the display device includes a touch-screen with an associated touch-screen controller. The display devices may be of any suitable configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, one or more of the display devices, as described above, display the plurality of simulated video reels 54. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active payline or otherwise occur in a winning pattern, occur on the requisite number of adjacent reels and/or occur in a scatter pay arrangement.

In one embodiment, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game could be accomplished through a simple "buy in" by the player if, for example, the player has been unsuccessful at qualifying through other specified activities.

Figure 2B:
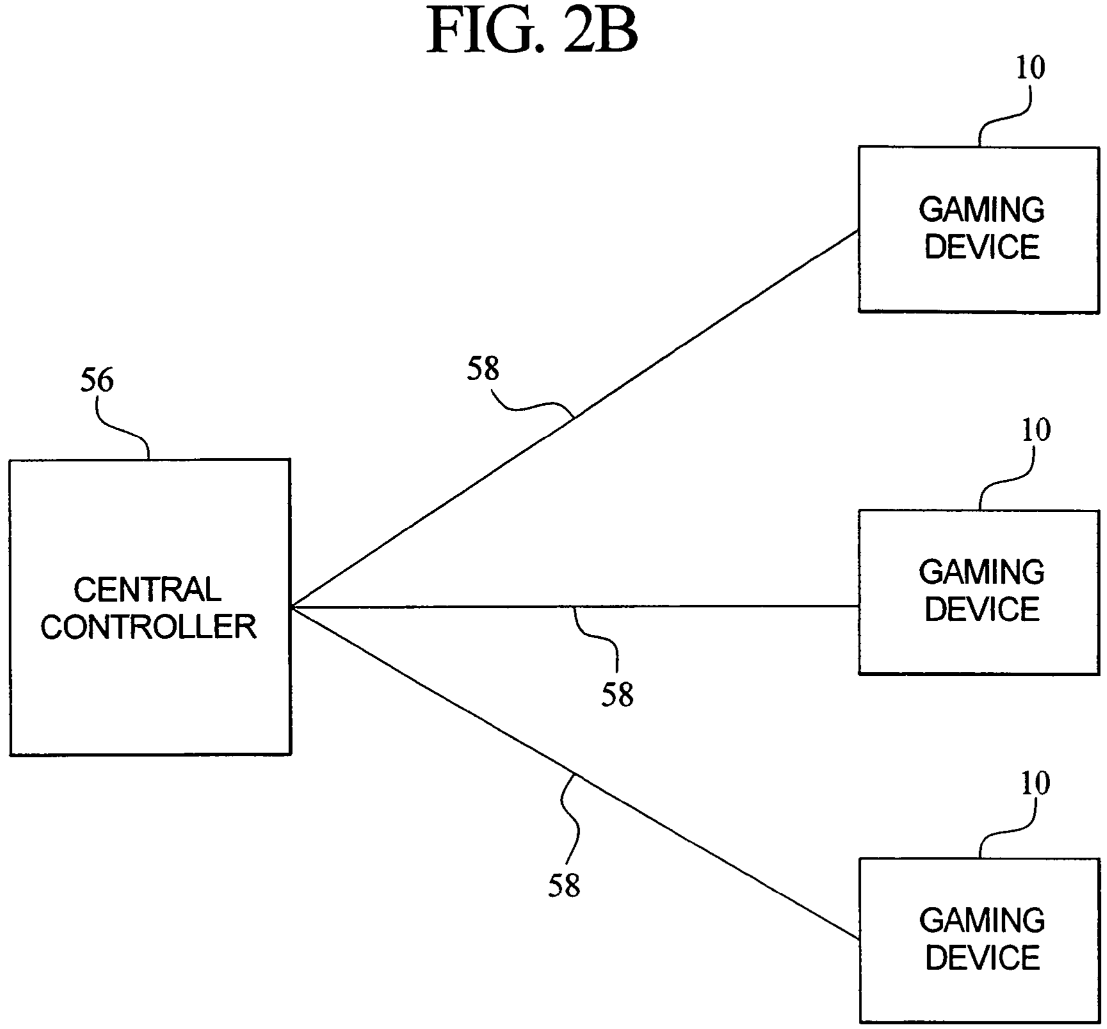
FIG. 2B is a schematic block diagram of various gaming devices are networked to a central controller.

In one embodiment, as illustrated in FIG. 2B, one or more of the gaming devices 10 may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo or keno game. In this embodiment, each individual gaming device utilizes one or more bingo or keno games to determine the predetermined game outcome value provided to the player for the interactive game played at that gaming device. In one embodiment, the bingo or keno game is displayed to the player. In another embodiment, the bingo or keno game is not displayed to the player, but the results of the bingo or keno game determine the predetermined game outcome value for the interactive game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a "daub" button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the interne/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a “chip” to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer. In one embodiment, an individual gaming machine may trigger a progressive win, for example through a game play event such as a symbol-driven trigger. In one embodiment, the central server or other central controller determines when a progressive win is triggered. In one embodiment, a central controller and an individual gaming machine work in conjunction with each other to determine when a progressive win is triggered, for example through an individual gaming machine meeting a predetermined requirement established by the central controller.

Symbol Replacement Scheme

In an embodiment, individual symbols generated from a plurality of symbols which include a plurality of special or designated symbols, such as wild symbols, are individually displayed in each of an array of symbol positions. Referring to FIGS. 3A to 17, in an embodiment, the plurality of symbols are displayed on a plurality of reels of a slot machine. In an embodiment, a plurality of reels are adapted to display the generated symbols in symbol positions associated with the reels. In an embodiment, an independent reel is associated with each symbol position. Accordingly, each independent reel is adapted to display a generated symbol in each symbol position.

Figure 3A:
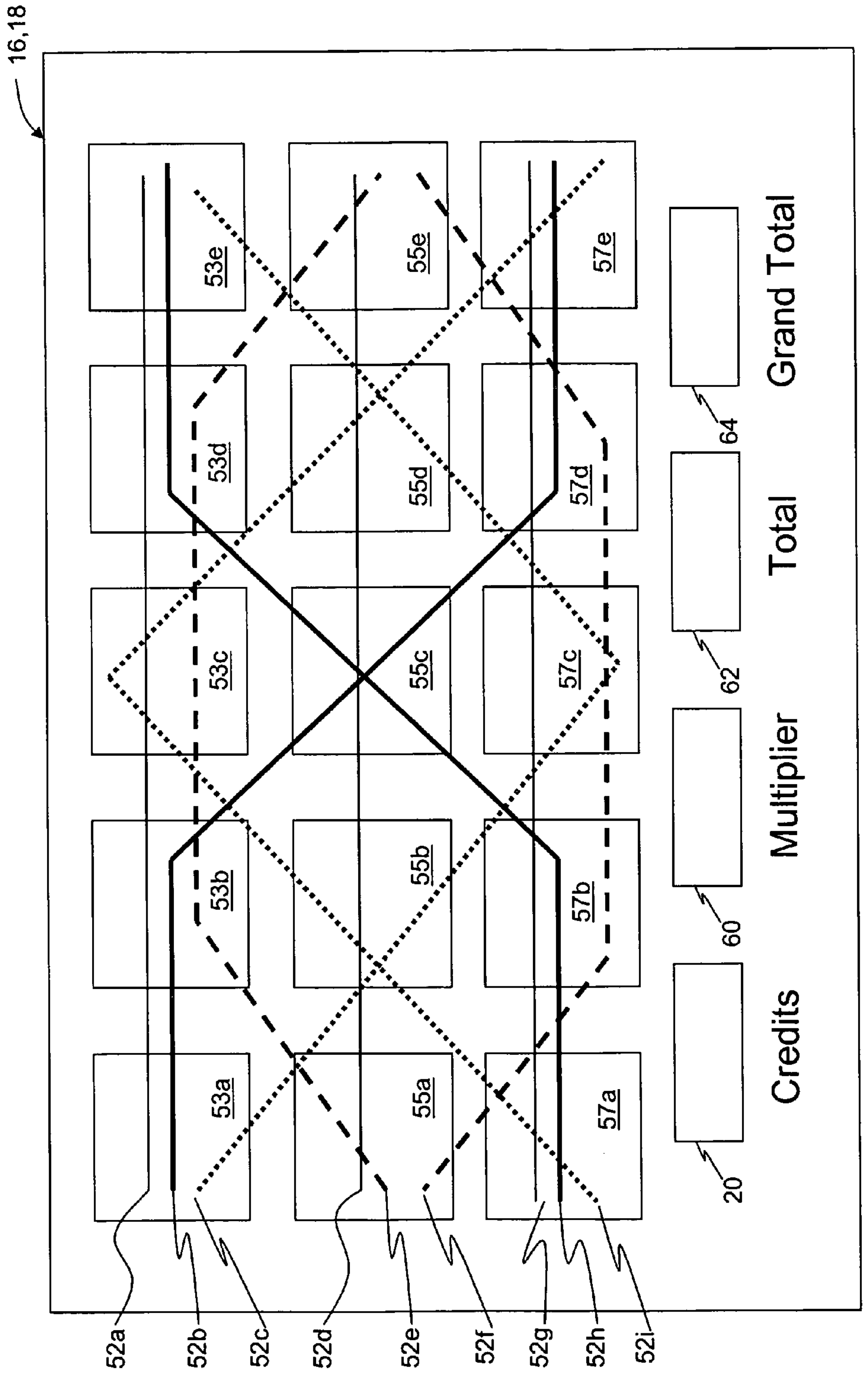
FIG. 3A is an elevation view of a display device illustrating the display of possible paylines in one embodiment of the gaming device.

The reels are activated upon a wager by a player. The gaming device generates symbols to be displayed on the reels. In an embodiment, the gaming device randomly generates symbols to be displayed on the reels. As illustrated in FIG. 3A, symbols are randomly generated to be displayed in three rows of five columns of symbol positions. The symbol positions are arranged in a first row of symbol positions 53*a*, 53*b*, 53*c*, 53*d* and 53*e*; a second row of five symbol positions 55*a*, 55*b*, 55*c*, 55*d* and 55*e*; and a third row of five symbol positions 57*a*, 57*b*, 57*c*, 57*d* and 57*e*.

The gaming device then determines if any winning combinations of symbols are displayed on the reels. In the embodiment illustrated in FIGS. 3A-17, symbol positions are associated by paylines wherein a winning combination of symbols includes the display of a predetermined combination of symbols in symbol positions arranged along a common payline. It should be appreciated that a payline may include any suitable number of symbol positions arranged in different columns, in different rows and in non-adjacent fashion, such as a scatter payline. In FIG. 3A, nine paylines, 52*a*, 52*b*, 52*c*, 52*d*, 52*e*, 52*f*, 52*g*, 52*h* and 52*i* are illustrated in association with the symbol positions. It should be appreciated, however, that any suitable number of paylines can be associated with the symbol positions. Payline 52*a* is associated with symbol positions 53*a*, 53*b*, 53*c*, 53*d* and 53*e*. Payline 52*b* is associated with symbol positions 53*a*, 53*b*, 55*c*, 57*d* and 57*e*. Payline 52*c* is associated with symbol positions 53*a*, 55*b*, 57*c*, 55*d* and 53*e*. Payline 52*d* is associated with symbol positions 55*a*, 55*b*, 55*c*, 55*d* and 55*e*. Payline 52*e* is associated with symbol positions 55*a*, 53*b*, 53*c*, 53*d* and 55*e*. Payline 52*f* is associated with symbol positions 55*a*, 57*b*, 57*c*, 57*d* and 55*e*. Payline 52*g* is associated with symbol positions 57*a*, 57*b*, 57*c*, 57*d* and 57*e*. Payline 52*h* is associated with symbol positions 57*a*, 57*b*, 55*c*, 53*d* and 53*e*. Payline 52*i* is associated with symbol positions 57*a*, 55*b*, 53*c*, 55*d* and 57*e*.

The display in FIG. 3A also includes a number of credits display 20, a multiplier display 60, a total credits display 62 and a grand total credits display 64.

The gaming device provides an award to the player for one or more of the winning combinations. FIG. 3B illustrates an example pay table which includes sixteen winning combinations. An award is associated with each symbol combination. For example, an award of five credits is associated with a combination of five "A" symbols along any of the wagered on paylines described above.

It should be appreciated that any number of suitable pay tables can be used to determine an award corresponding to a particular combination of symbols. The combination of symbols may include any of the same or different symbols. The combination of symbols may include any suitable number of symbols such as one or more symbols, even if the number of symbols in the winning combination is less than the number of symbols displayed in symbol positions along a payline. The combination of symbols may include any suitable arrangement of symbols such as symbols displayed in symbol positions adjacent or non-adjacent to one another. In addition, a new pay table may be applied to winning symbol combinations generated for each symbol replacement initiated by a triggering event.

The gaming device also determines if a triggering event occurs. In an embodiment, a triggering event occurs if at least two conditions are satisfied. A first condition includes a designated symbol generated to be displayed in one of the symbol positions, and a second condition includes a winning combination of symbols randomly generated to be displayed in associated symbol positions. For example, a triggering event occurs if at least one designated symbol is generated to be displayed in one of the symbol positions of a set of reels of a slot machine, and a winning combination of symbols is generated and displayed along a payline activated by the player upon a wager. The designated symbol may or may not be one of the symbols of the winning combination.

In addition, or alternatively, the triggering event occurs if the designated symbol is included in a combination of symbols randomly generated to be displayed in symbol positions associated with the symbol position displaying the designated symbol. For example, in the illustrated embodiment, the designated symbol is one of the symbols comprising a winning combination of symbols generated and displayed along a payline activated by the player upon a wager.

Also, in the illustrated embodiment, the designated symbol includes a wild symbol. It should be appreciated, however, that the designated symbol can include any suitable character, number, indicia or combination thereof designed to represent the designated symbol. It should be further appreciated that the designated symbol may include a predetermined combination of symbols.

Figure 4:
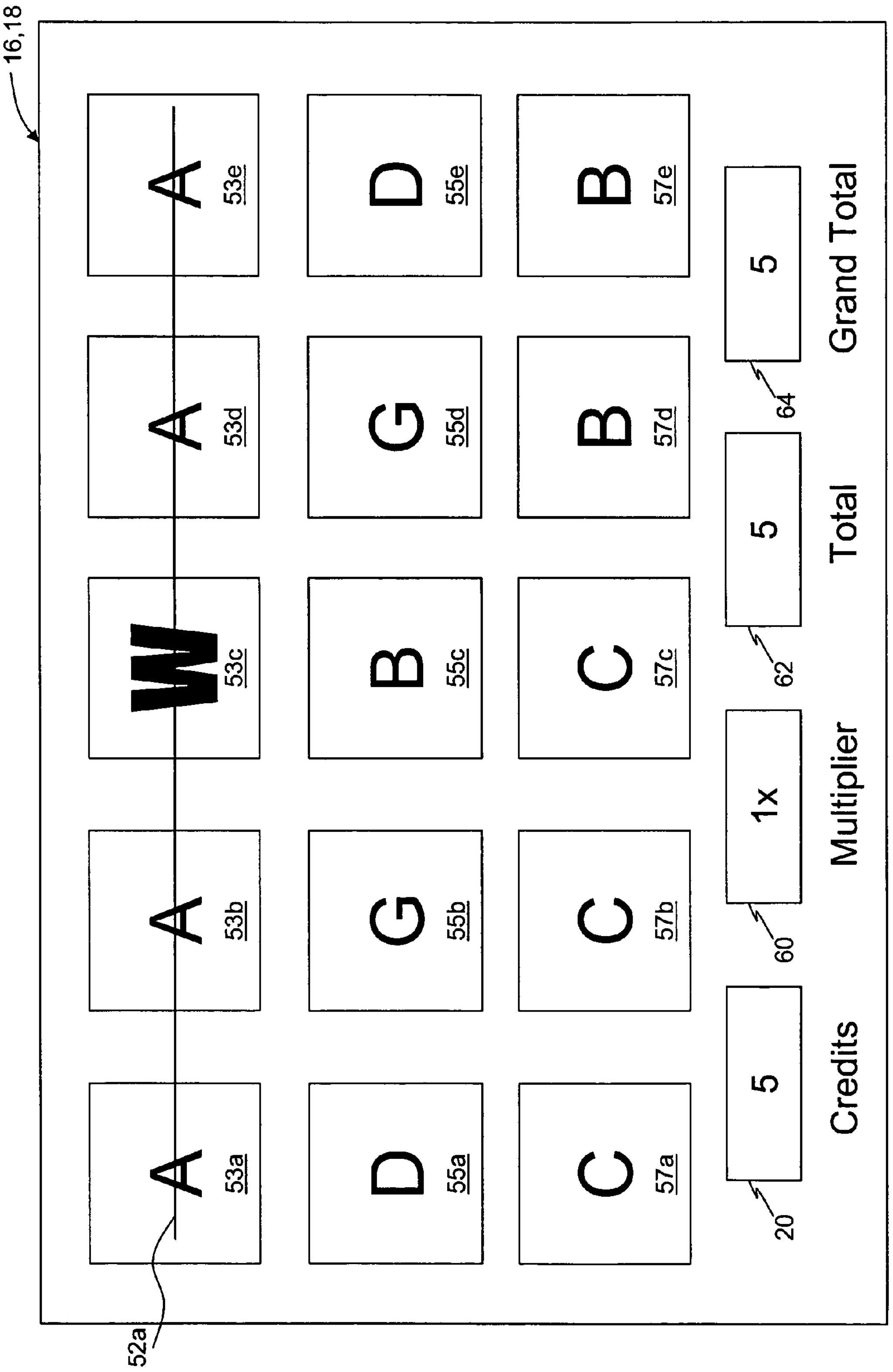
FIGS. 4, 5, 6, 7, 8, 9, 10, 11, 12A, 12B, 13A, 13B, 14A, 14B, 14C, 15, 16A, 16B and 17 are elevation views of a display device illustrating an example of an embodiment of the gaming device.

In FIG. 4, the gaming device randomly generates a plurality of symbols and displays the symbols, the randomly generated symbol in each symbol position of the matrix. As illustrated in FIG. 4, a winning combination of symbols is generated and displayed in symbol positions arranged along payline 52*a*. In addition, a wild symbol is generated and displayed in one of the symbol positions payline 52*a*. In the illustrated embodiment, the wild symbol acts as any symbol necessary to complete a winning combination of symbols. Therefore, the generation and display of four "A" symbols in symbol positions 53*a*, 53*b*, 53*d* and 53*e* and a wild symbol that can act as an "A" symbol corresponds to the "AAAAA" winning combination illustrated in the pay table of FIG. 3B. This winning combination is associated with an award of five credits. Accordingly, the gaming device displays five credits provided to the player in the credits display 20.

In an embodiment, a multiplier is provided to the player when a wild symbol is generated in a winning combination of symbols. The multiplier can be applied to at least the award associated with the winning combination which includes the wild symbol. In addition, the multiplier can modify awards associated with other winning combinations generated in the symbol positions. FIG. 3C illustrates an example table of a multiplier that incrementally increases with each occurrence of the triggering event. For example, upon the first occurrence of the triggering event, a 1× multiplier is applied to the award associated with any winning combination of symbols generated and displayed along an activated payline. Likewise, upon the second occurrence of the triggering event, a 2× multiplier is applied to the award associated with any winning combination of symbols generated and displayed along an activated payline. It should be appreciated that the modifier can stay the same between occurrences of the triggering event or can increase or decrease by any suitable increment. It should be further appreciated that the rate of incremental change between occurrences of the triggering event can vary.

In FIG. 4, the multiplier is 1× multiplied by the five credits to provide the player an award of five credits displayed in the total award display 62. The total number of credits achieved in the single generation of symbols in the symbol positions is also five credits as displayed in the grand total credit display 64.

In an embodiment, upon the occurrence of a triggering event, the designated symbol is locked such that the designated symbol remains displayed in the symbol position through at least one additional re-generation or replacement of the symbols of the winning combination displayed in the associated symbol positions. In the illustrated embodiment, the designated symbol remains displayed in the symbol position until the game ends. Therefore, the wild symbol generated and displayed in symbol position 53*c* as part of the winning combination illustrated in FIG. 4 remains displayed in symbol position 53*c* through at least the replacement of symbols in FIG. 5.

Figure 5:
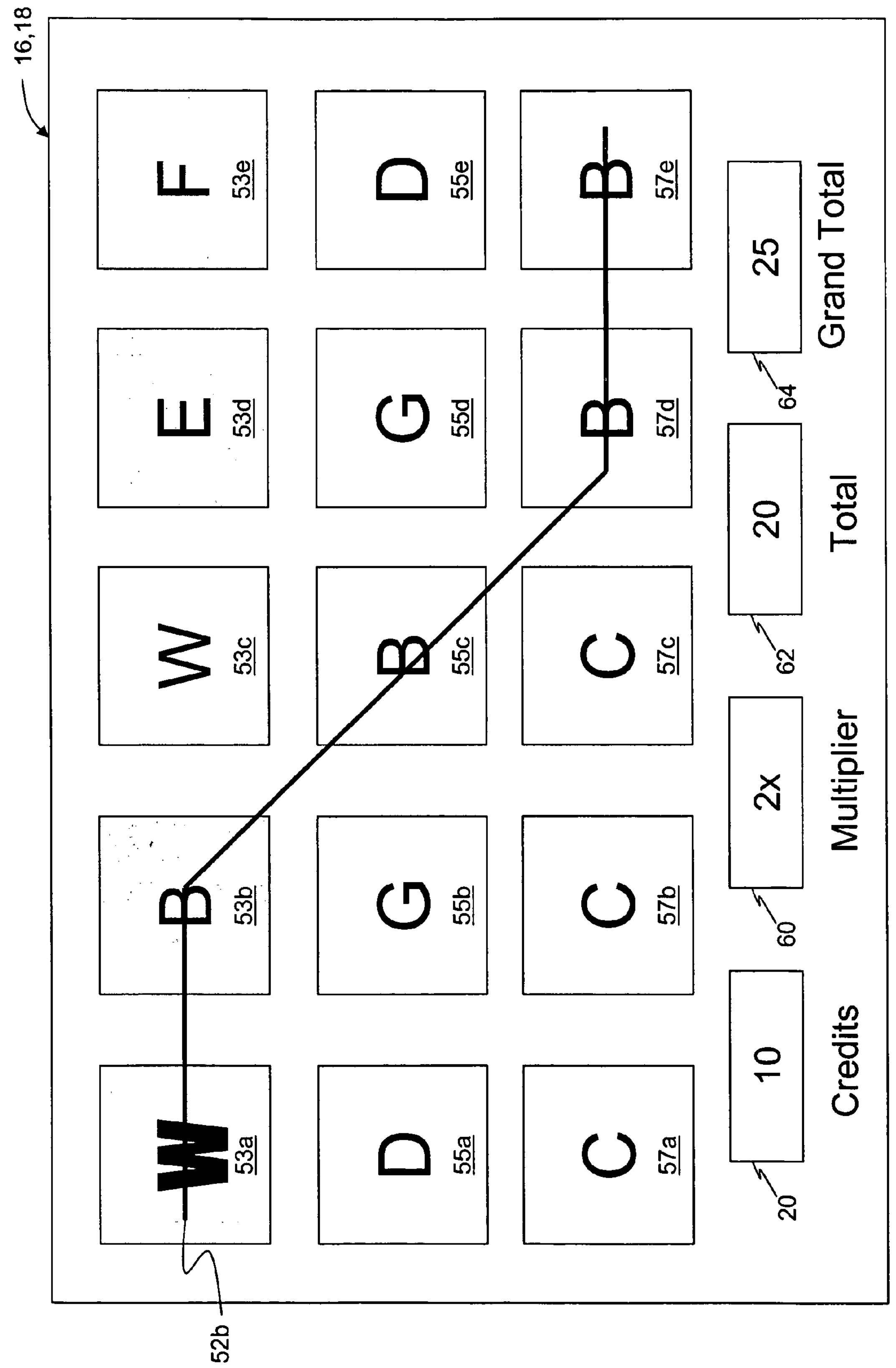

In addition, upon the occurrence of the triggering event, the symbols of the winning combination of symbols displayed in associated symbol positions are replaced with symbols generated by the gaming device. Therefore, in the illustrated embodiment, the display of a wild symbol along a payline that includes a winning combination of symbols causes the replacement of the non-wild symbols along those paylines as indicated by the shaded symbol positions. Accordingly, as illustrated in FIGS. 4 and 5, the gaming device replaces the winning combination of “A” symbols displayed in the symbol positions along payline 52*a* illustrated in FIG. 4, with symbols randomly generated by the gaming device illustrated in FIG. 5. Specifically, in FIG. 5, a “B” symbol is generated and replaces the “A” symbol displayed in symbol position 53*b*, an “E” symbol is generated and replaces the “A” symbol in symbol position 53*d* and an “F” symbol is generated and replaces the “A” symbol in symbol position 53*e*. In addition, another wild symbol is generated and replaces the “A” symbol in symbol position 53*a*.

When the symbols of the winning combination are replaced, the gaming device then determines if the replaced symbols form another winning combination of symbols displayed in the associated symbol positions. According to the pay table illustrated in FIG. 3B, no winning combination is included among the symbols replaced along payline 52*a*; therefore, in an embodiment, no subsequent triggering event occurs. In the illustrated embodiment, however, the gaming device evaluates other activated paylines for a winning combination of symbols which may or may not include at least one of the replaced symbols. If a winning combination of symbols includes at least one of the replaced symbols, the player receives any award corresponding to, or associated with, the winning combination. If a winning combination of symbols includes at least one of the replaced symbols, and if one of the replacement symbols includes a wild symbol, the triggering event occurs. Therefore, as illustrated in FIG. 5, the wild symbol replacing the “A” symbol in symbol position 53*a* is included in a winning combination of “B” symbols displayed in symbol positions along activated payline 52*b*.

In an embodiment, the wild symbol acts as a “B” symbol for purposes of completing a winning combination of symbols. Referring to the pay table illustrated in FIG. 3B, a combination of five “B” symbols corresponds to an award of ten credits. Therefore, the player is provided an award of ten credits as displayed in the credit display 20.

In an embodiment, the award associated with a winning combination included in satisfying a condition of the triggering event is modified by a modifier such as a multiplier. It should be appreciated, however, that any award provided to a player can be modified, whether or not the award was associated with a triggering event. In the illustrated embodiment, for example, a multiplier is provided to the player which increments upon each occurrence of the triggering event. Therefore, as illustrated in FIG. 5, because the second wild symbol associated with a winning combination has been generated, according to the incremented multiplier table illustrated in the pay table of FIG. 3B, the 1× multiplier is incrementally increased to a 2× multiplier. Therefore, a 2× multiplier is provided to the player as displayed in the multiplier display 60. The award provided to the player of ten credits is multiplied by the 2× multiplier to provide the player an award of twenty credits as displayed in the total award display 62. The twenty credits provided to the player in this symbol replacement is added to the credits provided to the player in the previous symbol replacement to provide the player a grand total of twenty-five credits as displayed in the grand total award display 64.

It should be appreciated that with the locking or fixing of a symbol, such as a wild symbol, that increases the likelihood of another winning combination being formed by the symbols on the reels, the probability that a triggering event will recur on the reels increases with each occurrence of the triggering event. This feature in combination with the incremental enhancement of the award associated with the winning combination condition of the triggering event by a modifier with each occurrence of the triggering event, the excitement of the game for the player intensifies quickly.

The combination of a wild symbol appearing in a winning combination of symbols triggers the locking of the wild symbol and the replacement of the other symbols in the winning combination. In the illustrated embodiment, the symbols included in satisfying the conditions of the triggering event from the immediately previous generation of symbols are replaced. For example, the symbols displayed in the symbol positions along payline 52*a* which were replaced in FIG. 5 are only replaced if they were included in satisfying the conditions triggering the replacement of the symbols of FIG. 5. Therefore, the “E” symbol displayed in symbol position 53*d* and the “F” symbol displayed in symbol position 53*e* illustrated in FIG. 5 are not replaced in FIG. 6 because the symbols were not included in a winning combination of symbols along an activated payline in the current symbol replacement. However, the “B” symbol displayed in symbol position 53*b* is replaced in FIG. 6 because the “B” symbol is included in the winning combination along payline 52*b* that triggered the replacement of the symbols along that payline.

Figure 6:
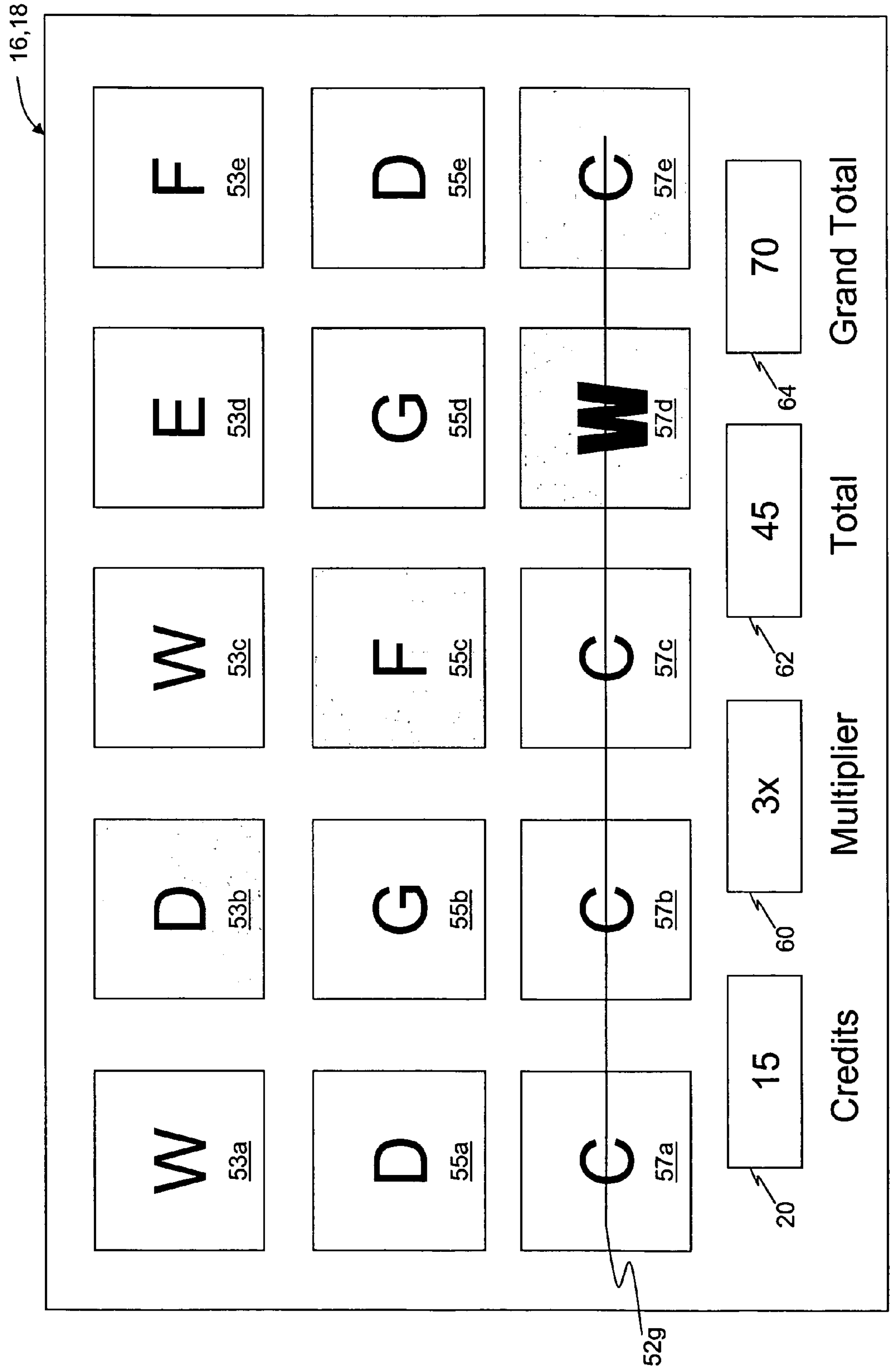

Hence, in FIG. 6, the symbol positions included in the winning combination illustrated in FIG. 5 are replaced with randomly generated symbols. Specifically, each of the symbols displayed in the symbol positions along payline 52*b* except for the wild symbol displayed in symbol position 53*a* is replaced with a randomly generated symbol. Accordingly, the “B” symbol displayed in symbol position 53*b* is replaced with a “D” symbol; the “B” symbol displayed in symbol position 55*c* is replaced with an “F” symbol; the “B” symbol displayed in symbol position 57*d* is replaced with a wild symbol; and the “B” symbol displayed in symbol position 57*d* is replaced with a “C” symbol.

A wild symbol is randomly generated along an activated payline 52*g* that includes a winning combination of “C” symbols displayed in symbol positions 57*a*, 57*b*, 57*c* and 57*e*. As illustrated in the pay table of FIG. 3B, a winning combination of “C” symbols corresponds to an award of fifteen credits. The multiplier is incremented from 2× to 3× as a result of a third wild symbol being generated in a winning combination. Therefore, the fifteen credits is multiplied by the 3× multiplier to provide the player an award of three hundred credits. The forty-five credits is added to the previous total credits to provide the player a grand total of seventy credits as illustrated in the grand total award display.

Figure 7:
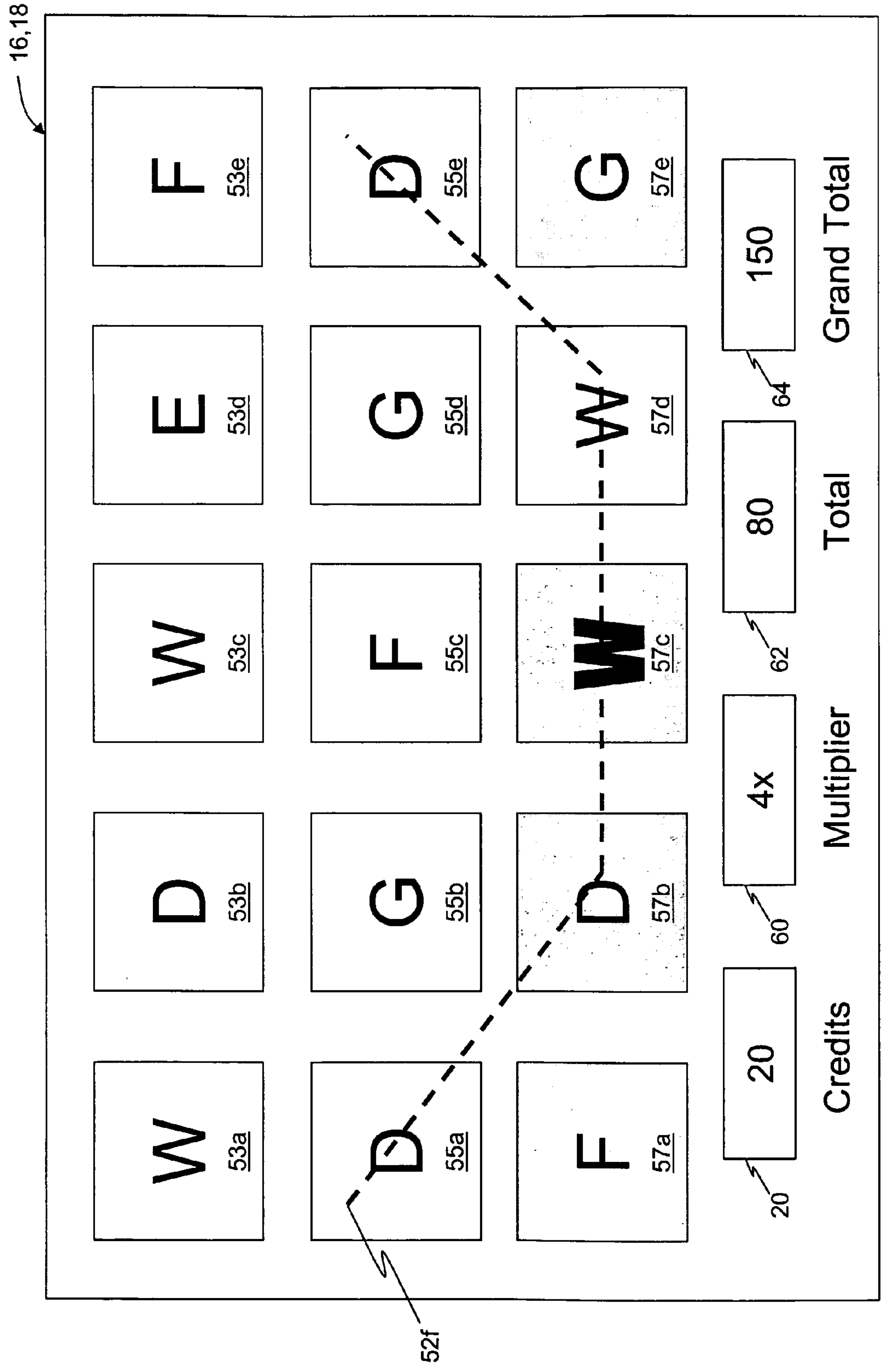

The generation of a winning combination that includes a wild symbol acts as a triggering event to replace the symbols in the winning combination other than the wild symbol. The "C" symbols illustrated in FIG. 6 are replaced by randomly generated symbols as illustrated in FIG. 7. Accordingly, the "C" symbol in symbol position 57*a* is replaced by an "F" symbol. The "C" symbol displayed in symbol position 57*b* is replaced by a "D" symbol. The "C" symbol displayed in symbol position 57*e* is replaced by a "G" symbol and the "C" symbol displayed in symbol position 57*c* is replaced by another wild symbol. The wild symbol included in the winning combination of "C" symbols remains displayed in symbol position 57*d*.

As illustrated in FIG. 7, the replacement of the "C" symbols with randomly generated symbols including a wild symbol produces a winning combination on payline 52*f*. The winning combination includes the wild symbol previously fixed or locked into position 57*d* as illustrated in FIG. 6 along with a replacement or new wild symbol replacing the "C" symbol in symbol position 57*c* as described above. The combination of "D" symbols in addition to the two wild symbols, which act as "D" symbols, corresponds to an award of twenty credits as illustrated in the pay table in FIG. 3B. It should be appreciated that the fixing or locking of wild symbols upon each occurrence of the triggering event increases the probability that a winning combination of symbols will be generated. Because the fourth triggering event has occurred with this symbol replacement, the multiplier increments or increases from a 3× multiplier, as illustrated in FIG. 6, to a 4× multiplier which is multiplied by the twenty credits provided to the player for the winning combination of "D" symbols in FIG. 7. Therefore, the player receives an additional eighty credits which is added to the previous number of credits to provide the player a grand total of one hundred fifty credits.

Figure 8:
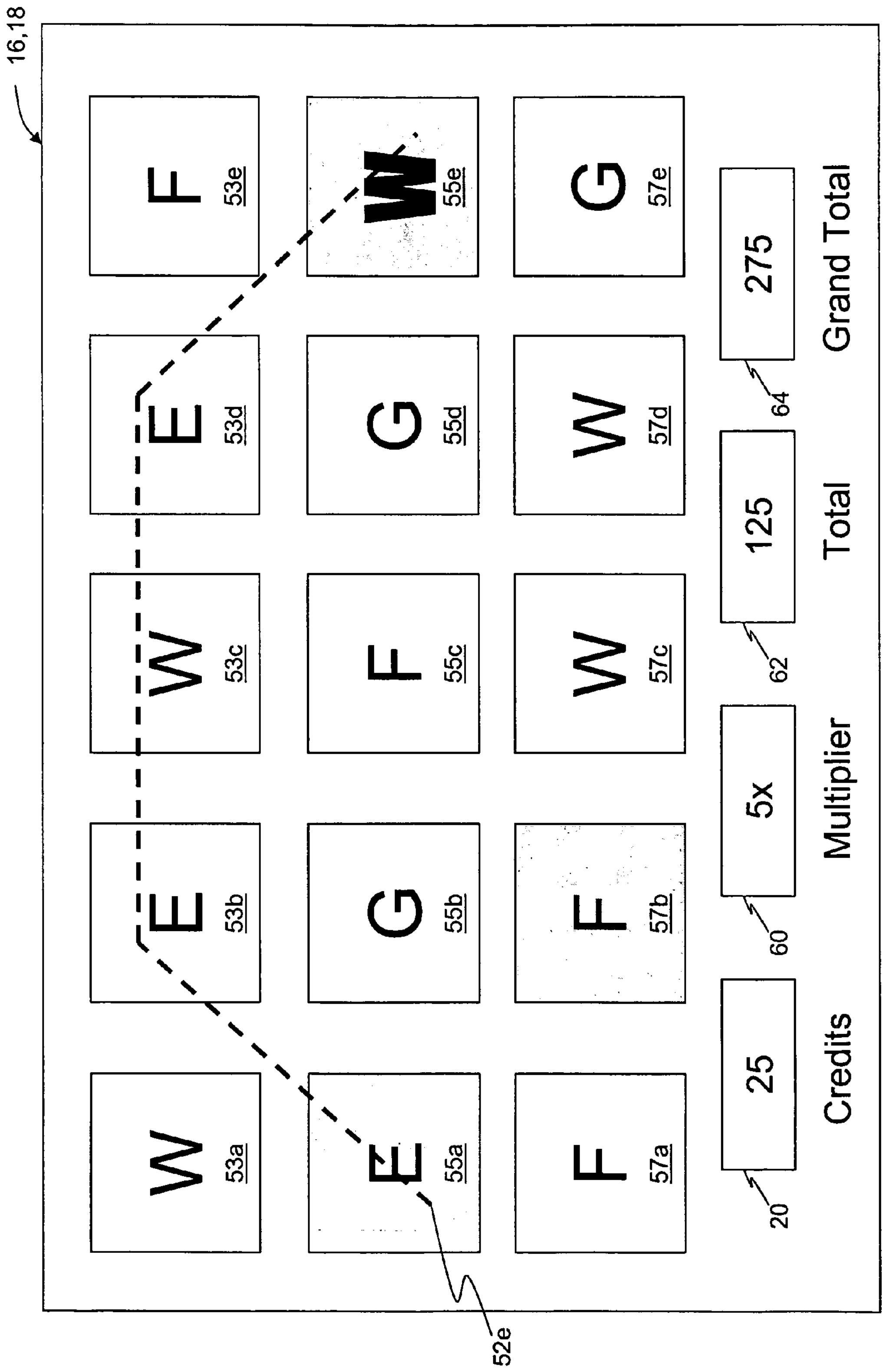

Similarly, in FIGS. 7 and 8, the "D" symbol in symbol position 55*a* is replaced by an "E" symbol. The "D" symbol in symbol position 57*b* is replaced by an "F" symbol. The "D" symbol displayed in symbol position 55*e* is replaced by a wild symbol. As illustrated in FIG. 8, although the wild symbol displayed and locked in symbol position 53*c* from a previous symbol replacement illustrated in FIG. 4, does not satisfy a condition of the triggering event, the wild symbol is included in a winning combination of "E" symbols on payline 52*e*. A winning combination of "E" symbols which includes a wild symbol that replaces one of the symbols of the previous winning combinations, contributes to another symbol replacement triggering event.

As illustrated in the pay table of FIG. 3B, a winning combination of "E" symbols corresponds to an award of twenty-five credits. The multiplier is increased from 4× to 5× in accordance with the fifth occurrence of the triggering event as specified in the table illustrated in FIG. 3C. The twenty-five credits is enhanced by the 5× multiplier to provide the player a total of one hundred twenty-five credits which is added to the previous grand total of credits to provide the player a grand total of two hundred seventy five credits.

Figure 9:
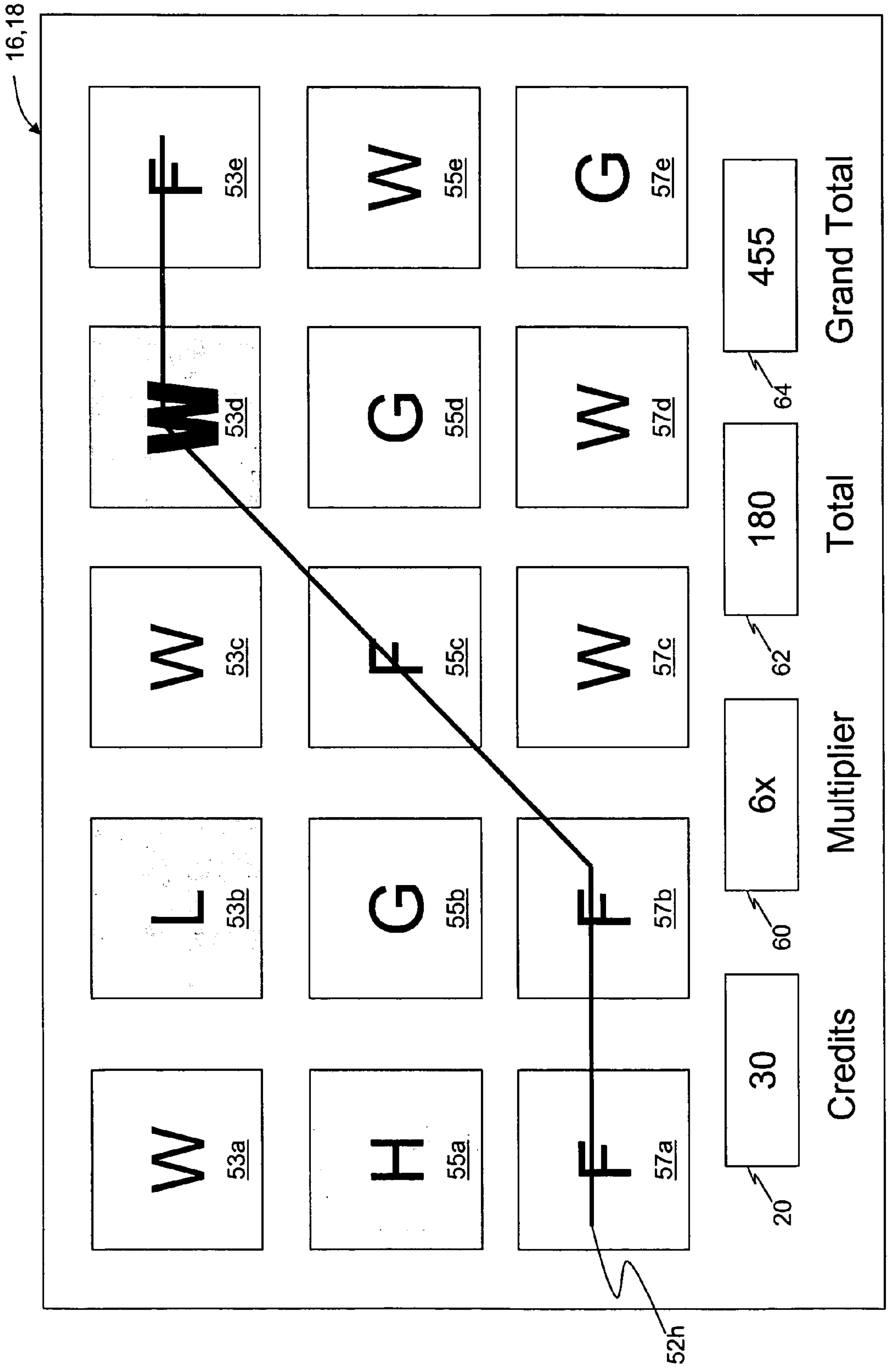
Figure 10:
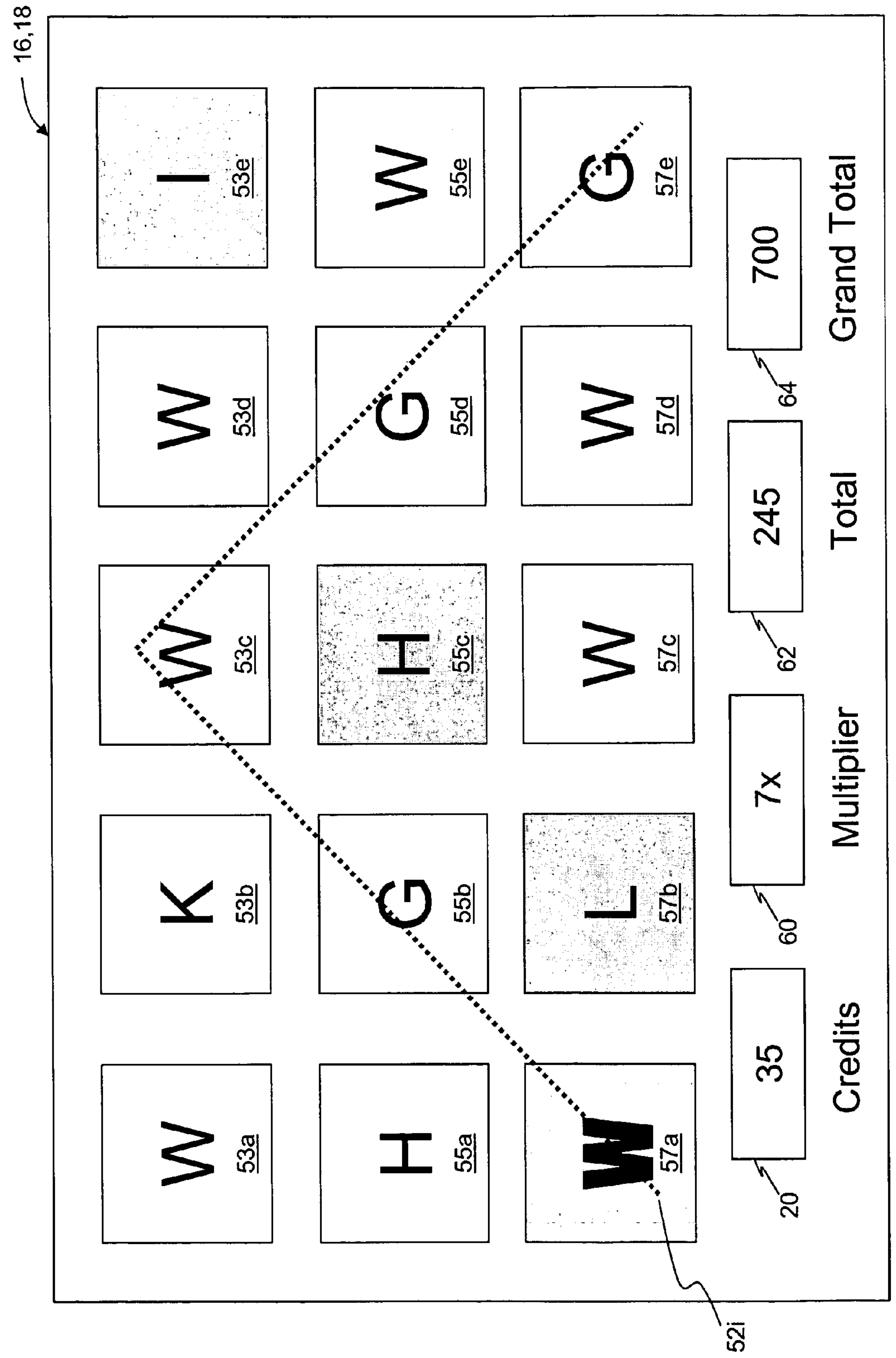

In FIGS. 8 and 9, the "E" symbol in symbol position 55*a* is replaced by an "H" symbol; the "E" symbol displayed in symbol position 53*b* is replaced by an "L" symbol; and the "E" symbol displayed in symbol position 53*d* is replaced by a wild symbol. A winning combination of "F" symbols and the wild symbols are displayed in the symbol positions along payline 52*h*. According to the pay table of FIG. 3B, a winning combination of "F" symbols corresponds to an award of thirty credits which is provided to the player. According to the table illustrated in FIG. 3C, a multiplier of 6× is provided to the player corresponding to the sixth triggering event. Therefore, the thirty credits are multiplied by the 6× multiplier to provide the player an award of one hundred eighty credits. The grand total award display 64 is updated to accumulate the credits from the previous grand total to provide the player a grand total of four hundred thirty-five credits, The generation of a wild symbol displayed in symbol position 53*d* and the generation of a winning combination of "F" symbols displayed in symbol positions along payline 52*h* causes a triggering event to occur. In FIG. 10, the symbols displayed in symbol positions along payline 52*h* are replaced with randomly generated symbols. Accordingly, the "F" symbol displayed in symbol position 57*a* is replaced with a wild symbol. The "F" symbol displayed in symbol position 57*b* is replaced with an "L" symbol. The "F" symbol displayed in symbol position 55*c* is replaced with an "H" symbol and the "F" symbol displayed in symbol position 53*e* is replaced with an "I" symbol.

To determine if an award will be provided to a player, the gaming device then determines if a winning combination occurs along a payline. A winning combination of "G" symbols and wild symbols appear along payline 52*i*. According to the pay table illustrated in FIG. 3B, a combination of five "G" symbols is associated with an award of thirty-five credits.

To determine if a triggering event has occurred, the gaming device determines if a winning combination occurs along a payline associated with the symbol position of the wild symbol displayed in symbol position 57*a*. Indeed, a winning combination occurs along payline 52*i*. Therefore, the wild symbol displayed in symbol position 57*a* is included in a winning combination along a payline, thereby satisfying the conditions of a triggering event to initiate the replacement of symbols. Additionally, a 7× multiplier is provided to the player because the winning combination along payline 52*i* fulfilled a condition of the triggering event. Therefore, the thirty-five credits provided to the player for the winning combination are multiplied by the 7× multiplier to provide the player a total of two hundred forty-five credits. The two hundred forty-five credits are then added to the previous grand total number of credits of four hundred fifty-five credits to provide the player a total of seven hundred credits.

Figure 11:
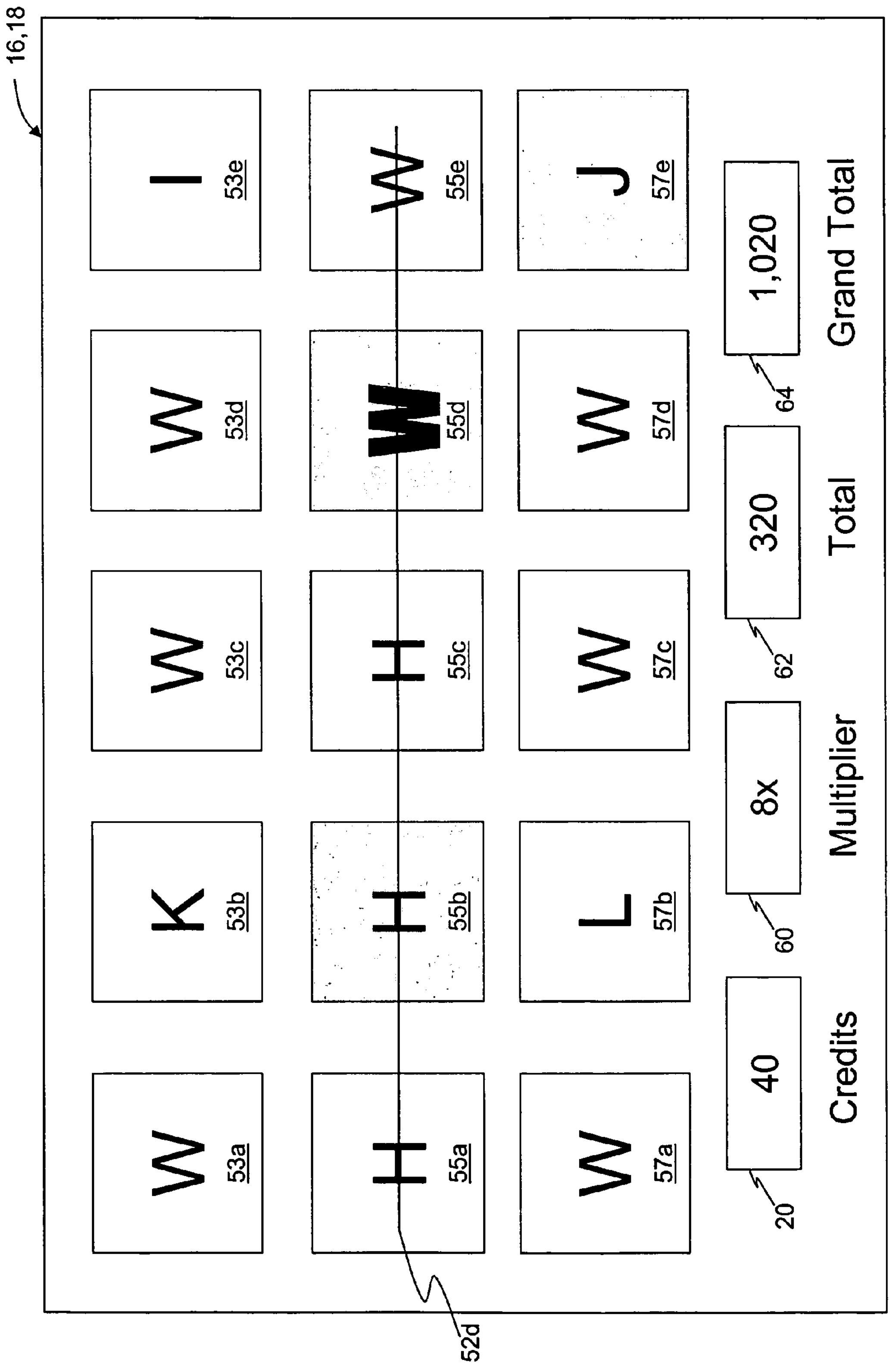

In FIG. 11, the wild symbol displayed in symbol position 57*a* is locked, and the symbols displayed in the symbol positions along payline 52*i* are replaced with randomly generated symbols. Thus, the symbols displayed in symbol positions 55*b*, 55*d* and 57*e* are replaced. FIG. 11 illustrates the replacement of the "G" symbol in symbol position 55*b* with an "H" symbol. The "G" symbol in symbol position 55*d* is replaced with a wild symbol. The "G" symbol in symbol position 57*e* is replaced with a "J" symbol. According to the pay table illustrated in FIG. 3B, five "H" symbols corresponds to an award of forty credits. The forty credits are multiplied by a multiplier that increments from 7× to 8× in accordance with the eighth occurrence of a triggering event as specified in the table illustrated in FIG. 3C to provide the player a total of three hundred twenty credits. The three hundred twenty credits is added to the previous grand total number of credits illustrated in FIG. 10 to provide the player a grand total of one thousand twenty credits.

As illustrated in FIG. 11, another winning combination occurs along a payline that includes a wild symbol. It should be appreciated that winning combinations including a new or replacement wild symbol can occur along more than one payline. Therefore, in FIGS. 12A and 12B, the symbols displayed in symbol positions along payline 52*d* are replaced except for the wild symbol that is locked in symbol position 55*d* and the wild symbol previously locked in symbol position 55*e*. Therefore, the "H" symbol in symbol position 55*a* is replaced with an "M" symbol. The "H" symbol displayed in symbol position 55*b* is replaced with a wild symbol. The "H" symbol displayed in symbol position 55*c* is replaced with an "L" symbol.

Figure 12A:
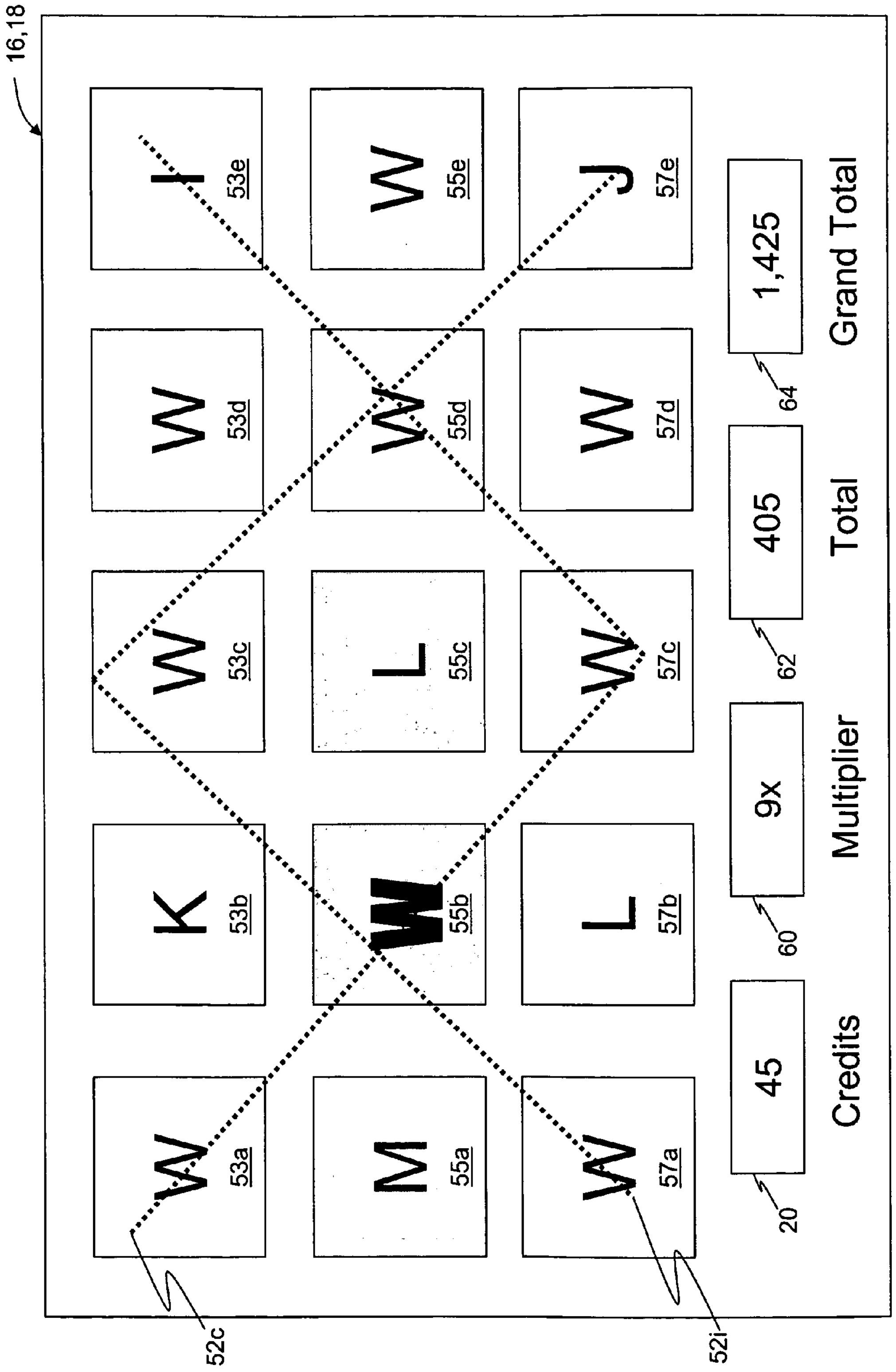
Figure 12B:
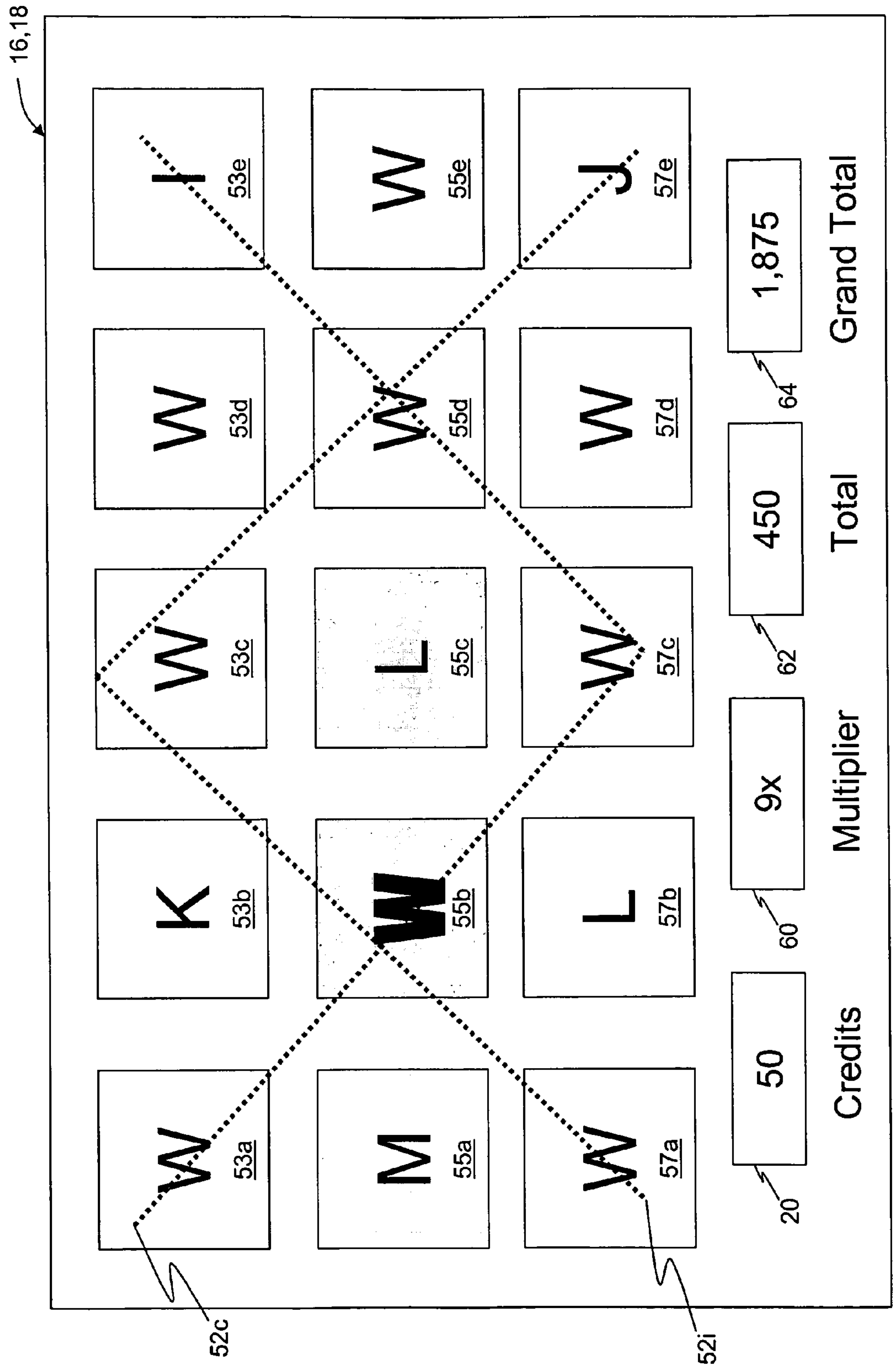

As illustrated in FIGS. 12A and 12B, a winning combination occurs on payline 52*c* running through and including the replacement wild symbol displayed in symbol position 55*b*. In addition, a winning combination occurs on payline 52*i* running through and including the same replacement wild symbol displayed in symbol position 55*b*. Therefore, the triggering event for another replacement of the symbols along the payline occurs.

Specifically, payline 52*c* includes a wild symbol in symbol position 53*a*, a wild symbol in symbol position 55*b*, a wild symbol in symbol position 57*c*, a wild symbol in symbol position 55*d*, and an "I" symbol in symbol position 53*e*. Each wild symbol is fixed leaving the "I" symbol displayed in symbol position 53*e* to be replaced. Similarly, payline 52*i* includes a wild symbol in symbol position 57*a*, a wild symbol in symbol position 55*b*, a wild symbol in symbol position 53*c*, a wild symbol in symbol position 55*d*, and a "J" symbol in symbol position 57*e*. Each wild symbol is fixed leaving the symbol displayed in symbol position 57*e* to be replaced.

According to the pay table of FIG. 3B, a winning combination of five "I" symbols corresponds to an award of forty-five credits. Therefore, in FIG. 12A, the player is provided forty-five credits and a multiplier that is incremented from 8× to 9× to provide four hundred five credits to the player. The four hundred five credits is added to the previous grand total number of credits in FIG. 11 to provide the player a grand total of one thousand four hundred twenty-five credits.

According to the pay table of FIG. 3B, a winning combination of five "J" symbols corresponds to an award of fifty credits. Therefore, in FIG. 12B, the player is provided fifty credits. In the illustrated embodiment, the same multiplier, 9×, is provided to the player to increase the award to four hundred fifty credits. In the illustrated embodiment, the award modifier is increased for each newly generated wild symbol included in a winning combination. Accordingly, two paylines running through the same replacement wild symbol is considered to be the same occurrence of a triggering event for purposes of determining if the multiplier is increased. It should be appreciated, however, that the award modifier can be increased for each winning combination including a newly generated wild symbol. As such, two paylines running through the same replacement wild symbol can be considered as two separate occurrences of the triggering event to increase the multiplier to the next incremental value. The four hundred fifty credits are added to the previous grand total number of credits in FIG. 11 to provide the player a grand total of one thousand eight hundred seventy-five credits.

Figure 13A:
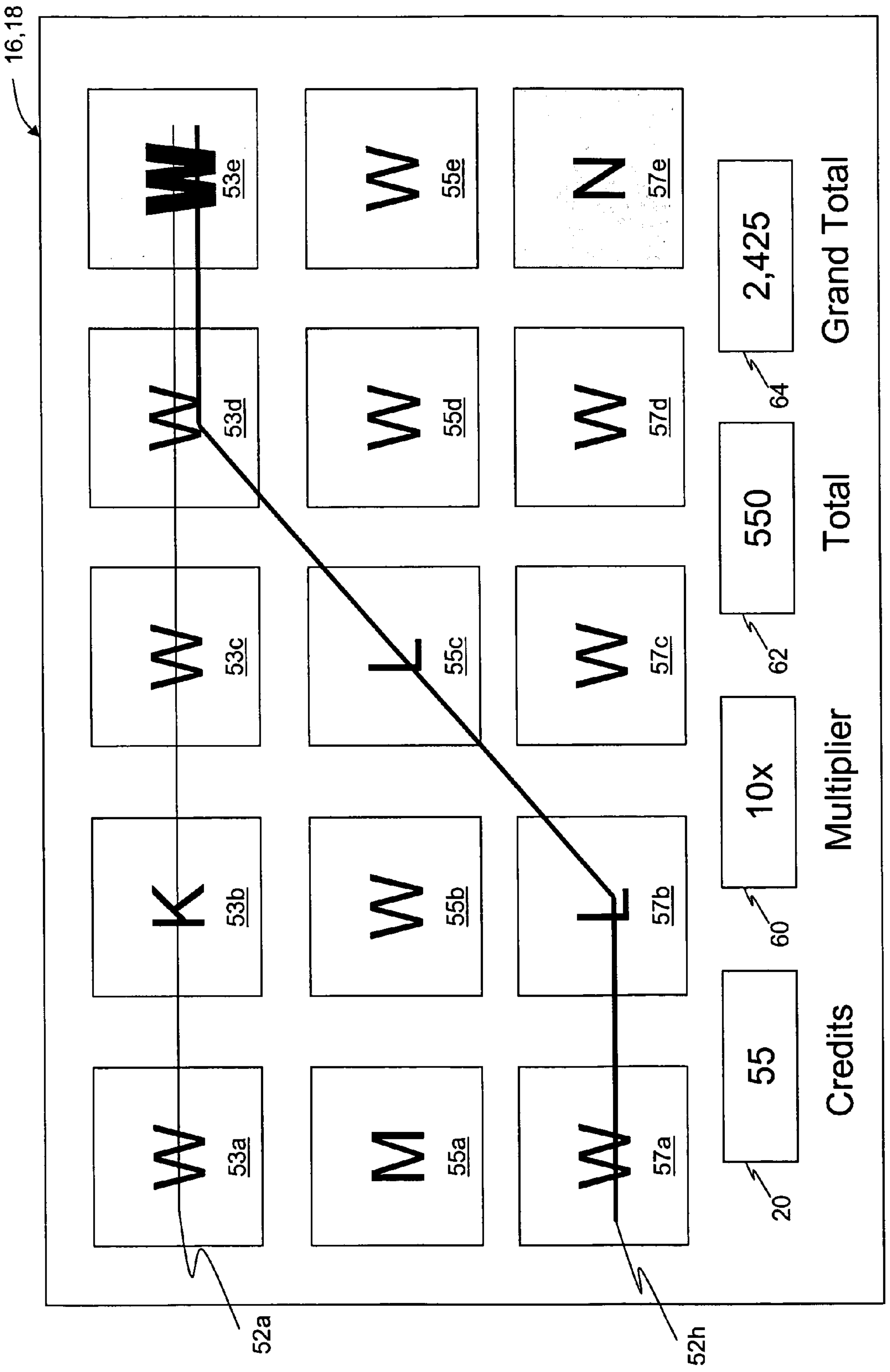
Figure 13B:
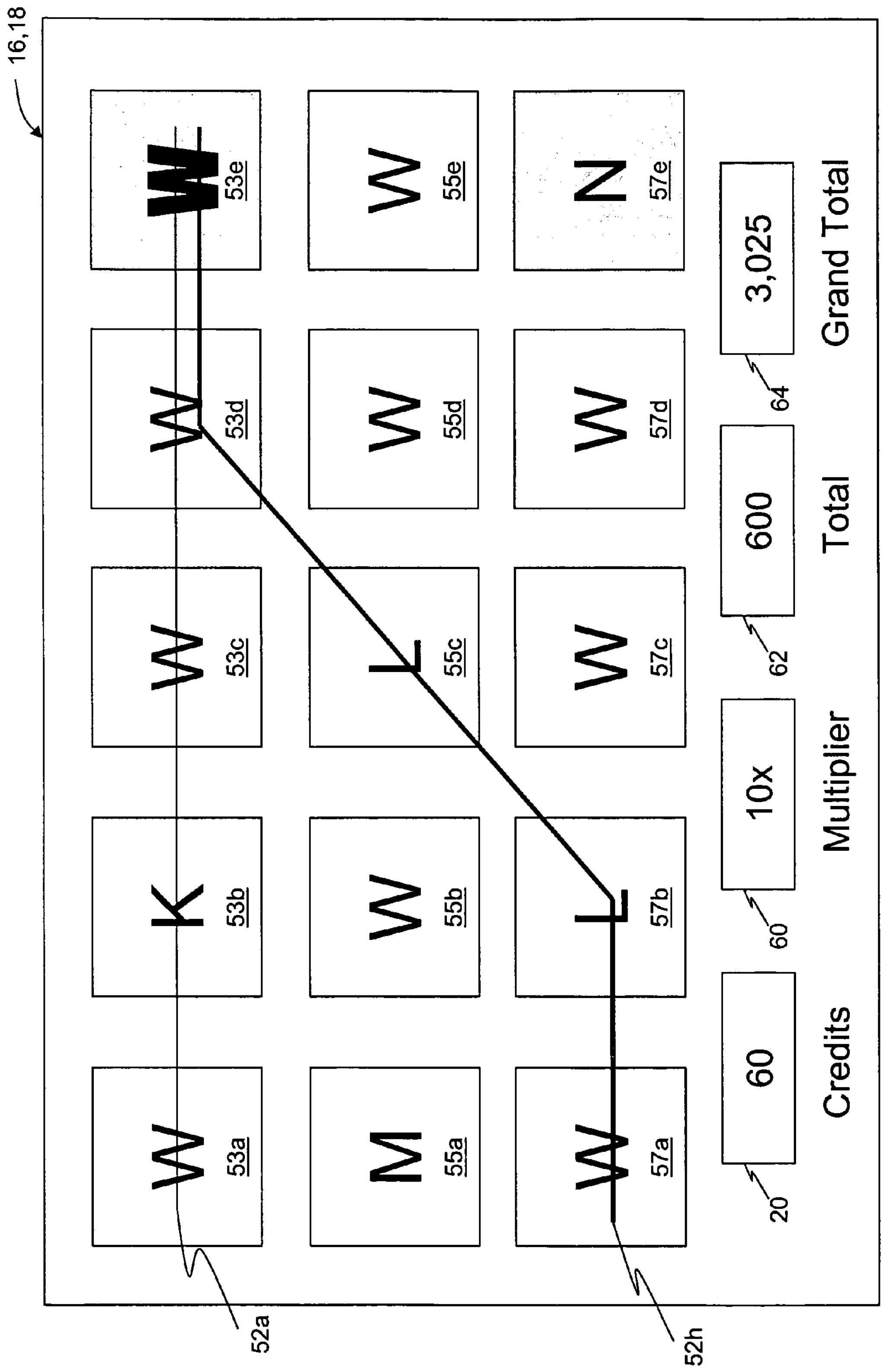

As in FIGS. 12A and 12B, winning combinations including a replacement wild symbol also occur along two paylines when the symbols displayed in the symbol positions along payline 52*d* are replaced in FIGS. 13A and 13B. As illustrated in FIGS. 12A and 12B, the only symbol that can be replaced that is displayed in a winning combination along a payline (payline 52*c*) associated with a replacement wild symbol is the "I" symbol in symbol position 53*e*. In FIGS. 13A and 13B, the "I" symbol in symbol position 53*e* is replaced with a wild symbol, and the "J" symbol in symbol position 57*e* is replaced with an "N" symbol.

Again, two winning combinations of symbols occur in symbol positions along paylines associated with the new wild symbol. Paylines 52*a* and 52*h* include a winning combination of symbols and a wild symbol displayed in the symbol positions associated with the paylines. Specifically, a wild symbol is displayed in symbol position 53*a*, a "K" symbol is displayed in symbol position 53*b*, a wild symbol is displayed in symbol position 53*c*, a wild symbol is displayed in symbol position 53*d*, and a new wild symbol is displayed in symbol position 53*e*. The symbols displayed along payline 52*h* include a wild symbol displayed in symbol position 57*a*, a "L" symbol displayed in symbol position 57*b*, a "L" symbol displayed in symbol position 55*c*, a wild symbol displayed in symbol position 53*d* and the new wild symbol displayed in symbol position 53*e*.

Thus, the winning combination of five "K" symbols illustrated in FIGS. 13A and 13B corresponds to an award of fifty-five credits according to the pay table in FIG. 3B. Therefore, the player receives fifty-five credits multiplied by a multiplier that is incremented from 9×, in FIG. 12B, to 10× to provide the player a total of five hundred fifty credits. The five hundred fifty credits is, in turn, added to the previous grand total to provide the player a grand total of two thousand four hundred twenty-five credits in FIG. 13A.

According to the pay table of FIG. 3B, a winning combination of five "L" symbols corresponds to an award of sixty credits. Therefore, the player is provided sixty credits which are multiplied by the same multiplier 10×, providing the player an award of six hundred credits. The six hundred credits is added to the previous grand total number of credits in FIG. 13A to provide the player a grand total of three thousand twenty-five credits in FIG. 13B.

Figure 14A:
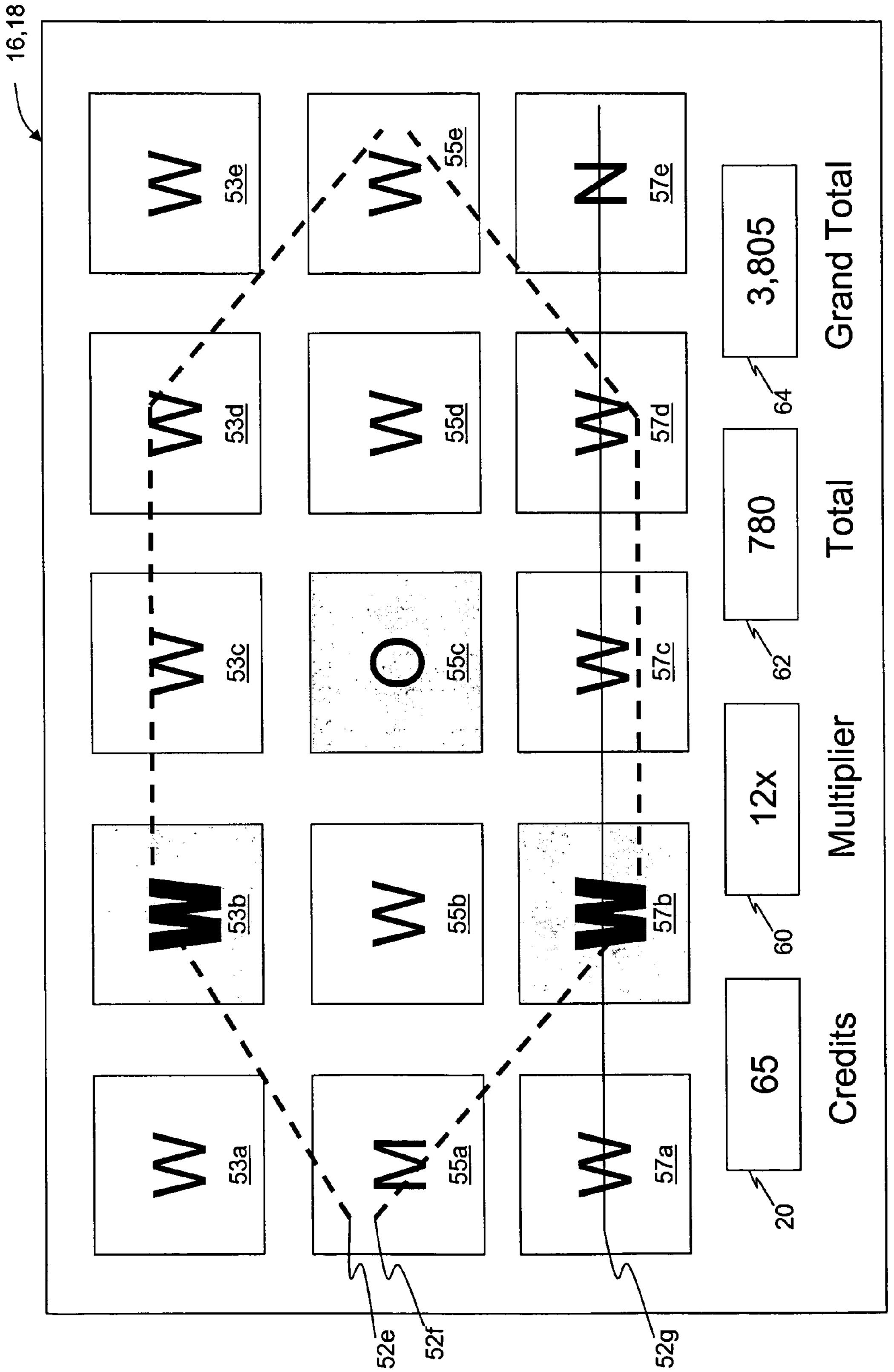

Again, as described above, the display of a wild symbol along a payline that includes a winning combination of symbols causes the replacement of the non-wild symbols along those paylines as indicated by the shaded symbol positions. Therefore, as illustrated in FIGS. 13A and 13B, the "K" symbol displayed along payline 52*b* and the "L" symbols displayed along payline 52*h* are replaced with generated symbols. As illustrated in FIG. 14A, the "K" symbol displayed in symbol position 53*b* is replaced with a wild symbol and the "L" symbol displayed in symbol position 57*b* is replaced with a wild symbol, the "L" symbol displayed in symbol position 55*c* is replaced with an "O" symbol.

It should be appreciated that any number of wild symbols can be generated as replacement symbols in a single symbol generation. It should also be appreciated that, as the number of wild symbols locked in the symbol positions increases, the likelihood of generating a winning combination along a payline that includes that wild symbol, increases. For example, as illustrated in FIG. 14A, two new wild symbols are generated and displayed in symbol positions 53*b* and 57*b*. In contrast to FIGS. 12A and 12B and FIGS. 13A and 13B, winning combinations occur along paylines including different new wild symbols. Specifically, at least three winning combinations occur along paylines 52*e*, 52*f* and 52*g* associated with the new wild symbols displayed in symbol positions 53*b* and 57*b*.

The winning combination of "M" symbols displayed in symbol positions along payline 52*e* corresponds to an award of sixty-five credits. The sixty-five credits is multiplied by an incremented multiplier that increases from 10× to 12× to provide the player a total of seven hundred eighty credits. The seven hundred eighty credits is then added to the previous grand total number of credits illustrated in FIG. 13B to provide the player a grand total of three thousand eight hundred five credits.

It should be appreciated that the rate of incremental change between occurrences of the triggering event can vary such that the increase in the multiplier between the tenth and eleventh occurrences of the triggering event can increase by an increment of two instead of an incremental change of one as in the increase in the multiplier between the ninth and tenth occurrences of the triggering event, for example. It should also be appreciated that the multiplier may increment more than once for every occurrence of the triggering event, such that a different multiplier is applied to the awards associated with at least two winning combinations of symbols generated in response to the same triggering event, for example. The multiplier may also increment less than once for each occurrence of the triggering event, such that the multiplier remains the same for at least one subsequent occurrence of the triggering event, for example.

Figure 14B:
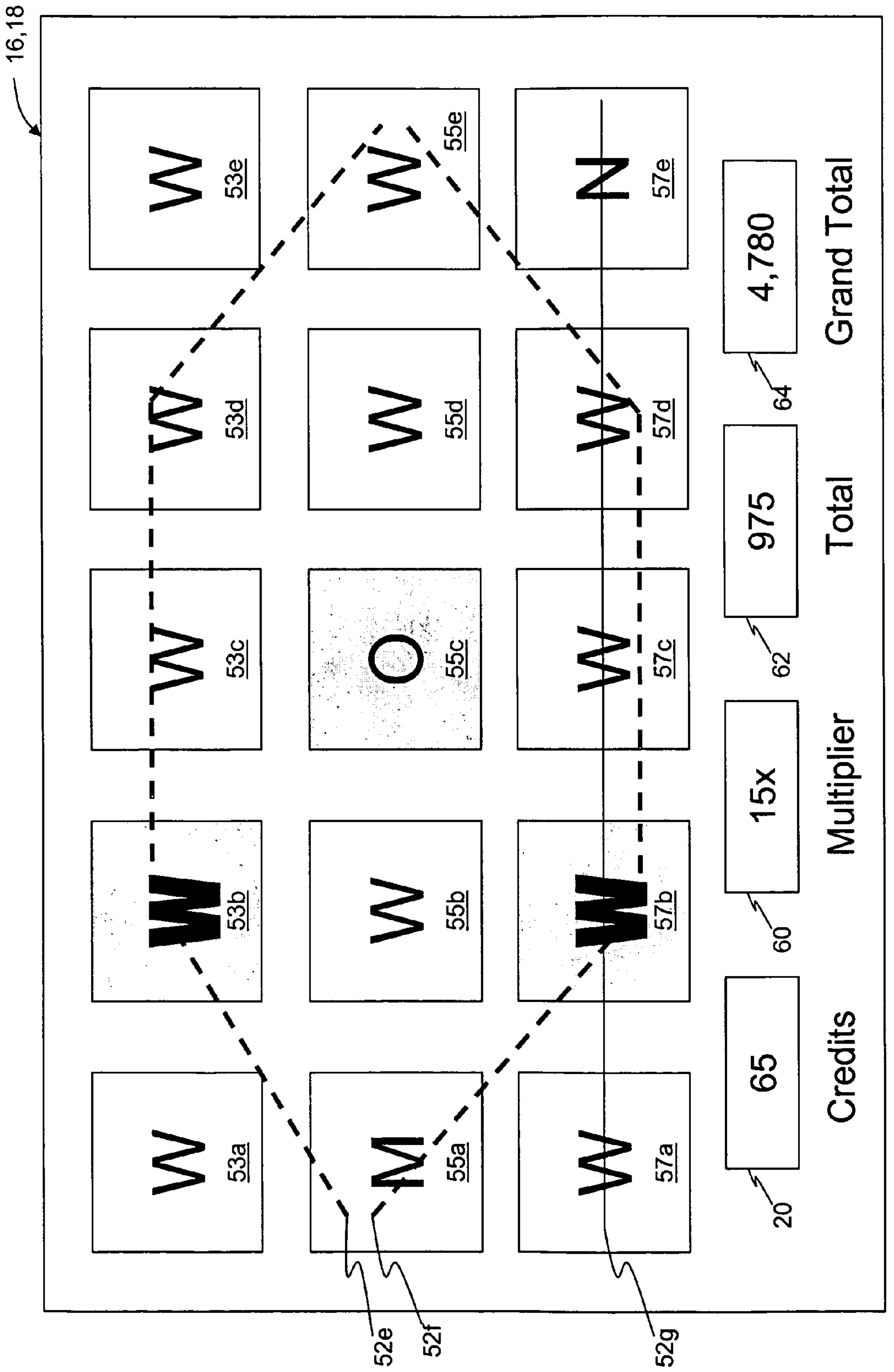

As illustrated in FIG. 14B, another winning combination that includes the same "M" symbol displayed in symbol position 55*a*, but a different new wild symbol displayed in symbol position 57*b* occurs along payline 52*f* and is associated with the award of sixty-five credits as in FIG. 14A. The sixty-five credits, however, are multiplied by a multiplier that is incremented from 12× to 15× according to the table in FIG. 3C. The multiplier is increased in this embodiment because the winning combination of symbols along payline 52*f* includes a different new wild symbol displayed at symbol position 57*b*. A triggering event considered to be separate from the triggering event along payline 52*e*, therefore, occurs with this combination. Accordingly, the player receives an award of nine hundred seventy-five credits. The nine hundred seventy-five credits is added to the previous grand total number of credits to provide the player a grand total of four thousand seven hundred eighty credits.

Figure 14C:
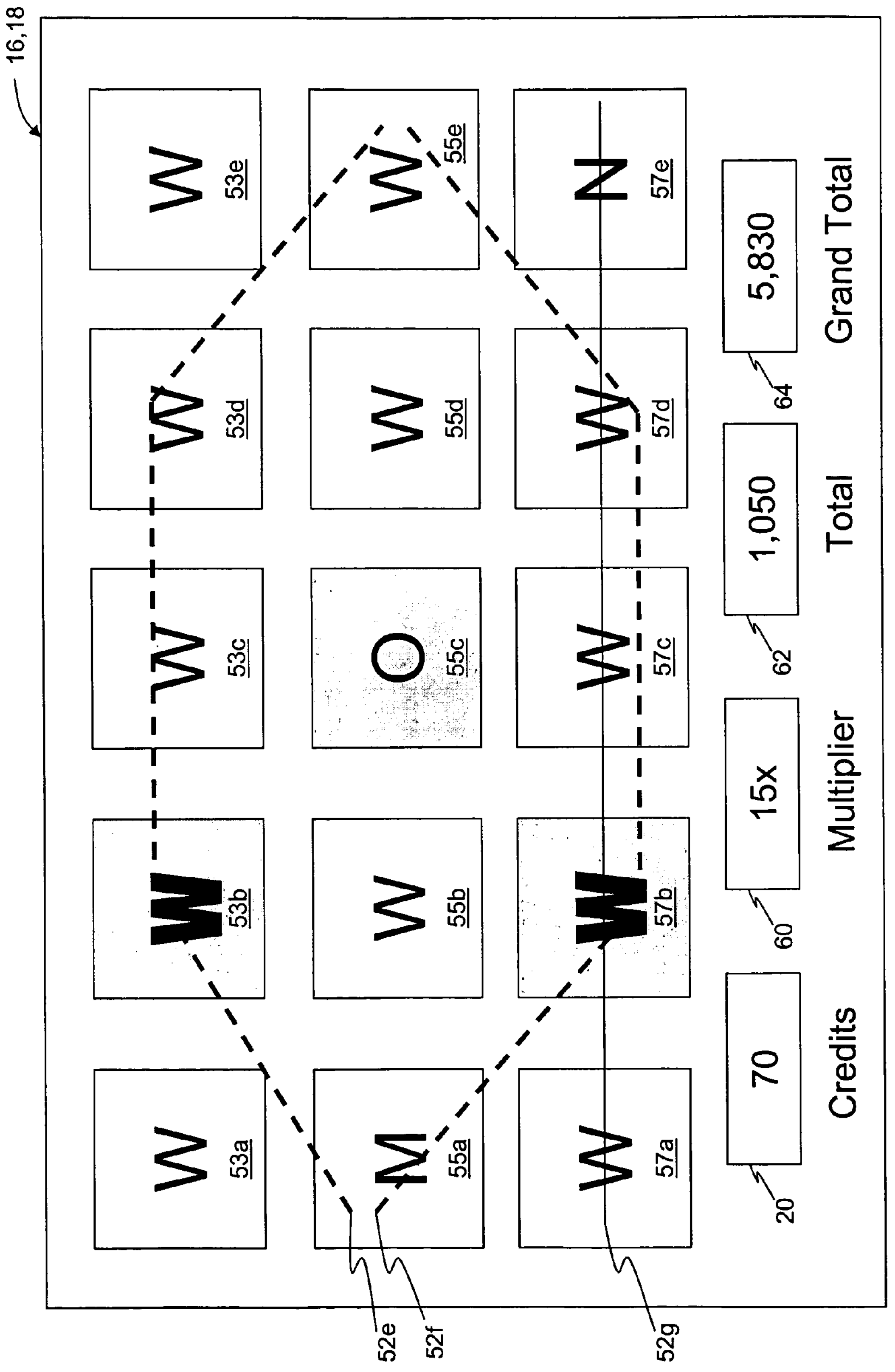

In FIG. 14C, the player is provided seventy credits corresponding to the winning combination including an "N" symbol according to the pay table in FIG. 3B. The seventy credits is multiplied by the same 15× multiplier because the winning combination of symbols along payline 52*f* includes the same new wild symbol displayed at symbol position 57*b*. Accordingly, the gaming device provides the player a total of one thousand fifty credits. The one thousand fifty credits is added to the previous grand total number of credits in FIG. 14B to provide the player a grand total of five thousand eight hundred thirty credits.

In an alternative embodiment, an award is associated with a combination of wild symbols. For example, in addition to the winning combinations of symbols along paylines 52*e*, 52*f* and 52*g*, the wild symbols displayed in symbol positions along payline 52*a* can be associated with an award. In an embodiment, the award associated with a winning combination of wild symbols can include a separate award. Alternatively, the award associated with a winning combination of wild symbols can include the award associated with one of the winning combinations listed in the paytable such as one hundred credits associated with the five "P" symbols listed in the paytable illustrated in FIG. 3B.

Figure 15:
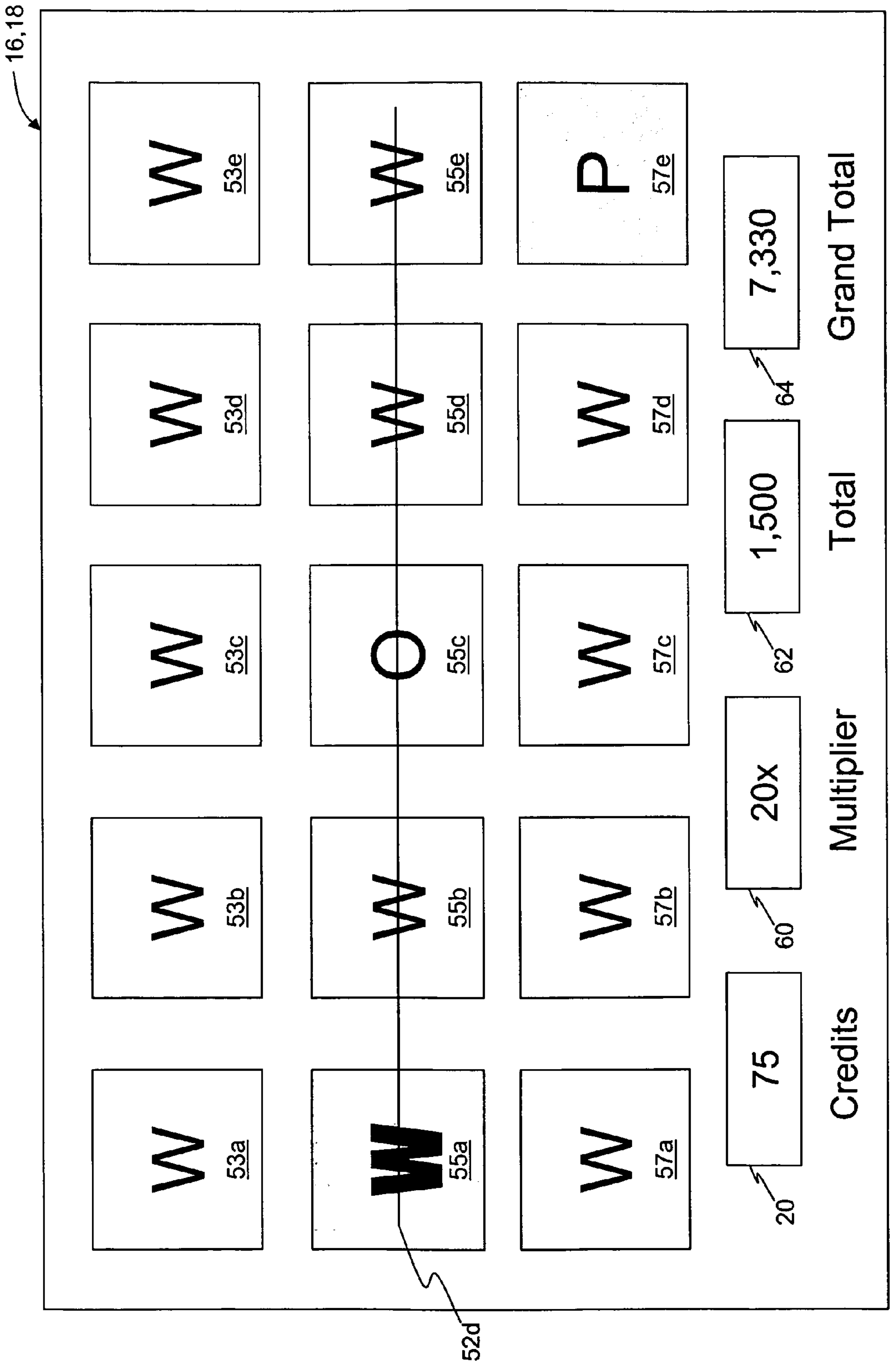

The wild symbols generated in symbol positions along the paylines in FIGS. 14A, 14B and 14C are locked, and the symbols included in the winning combinations along each of the paylines are replaced with randomly generated symbols. In FIG. 15, the "M" symbol displayed in symbol position 55*a* of FIG. 14C is replaced by a wild symbol. The "N" symbol illustrated in symbol position 57*e* is replaced by a "P" symbol as illustrated in FIG. 15.

A winning combination including an "O" symbol along payline 52*d* is illustrated in FIG. 15. A winning combination including an "O" symbol corresponds to an award of seventy-five credits as illustrated in the pay table of FIG. 3B. The seventy-five credits is multiplied by an incremented multiplier that is increased from 15× to 20×, providing the player an award of one thousand five hundred credits. The one thousand five hundred credits is added to the previous grand total of five thousand eight hundred thirty credits to provide the player a grand total of seven thousand three hundred thirty credits.

Figure 16A:
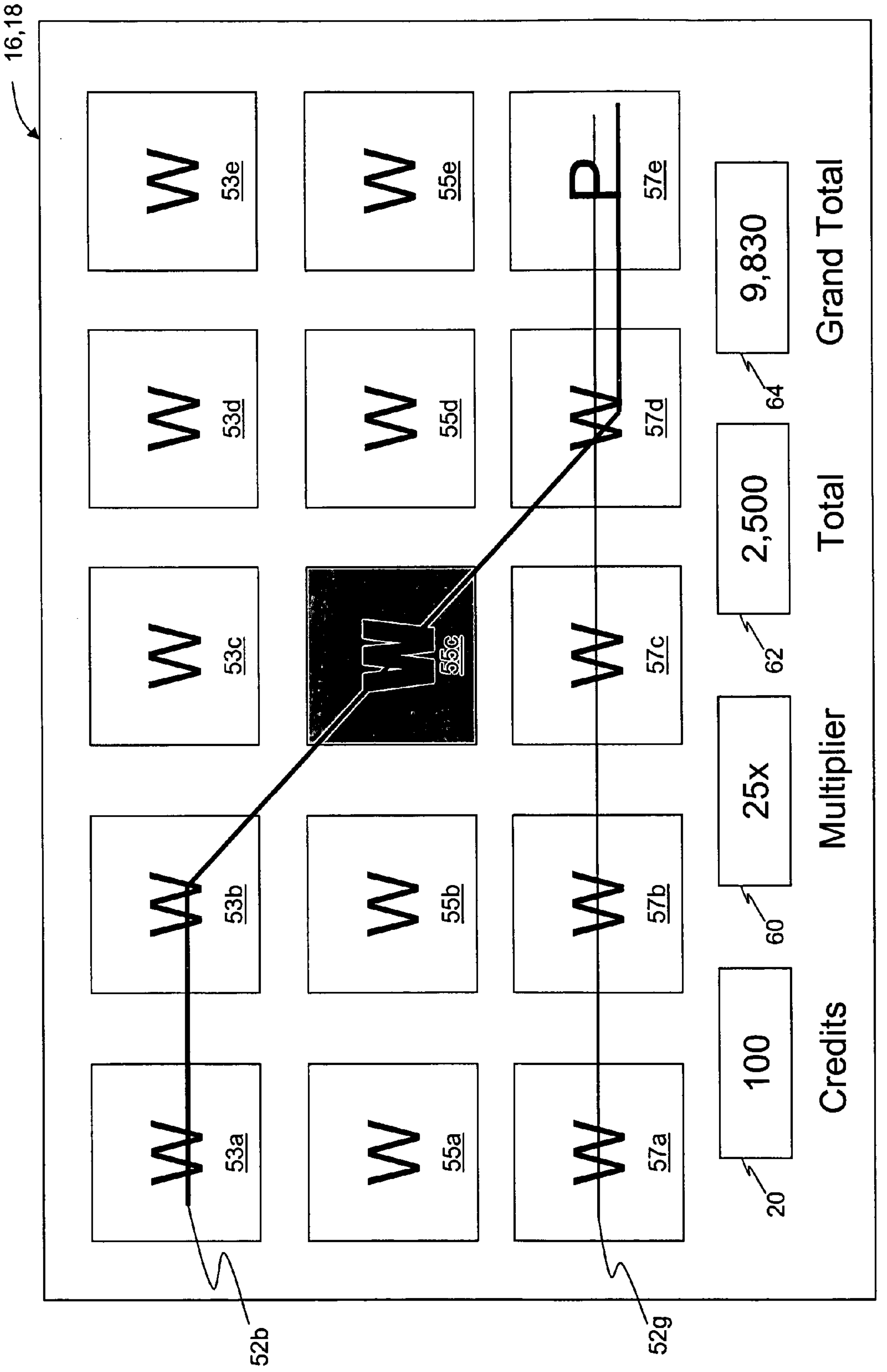
Figure 16B:
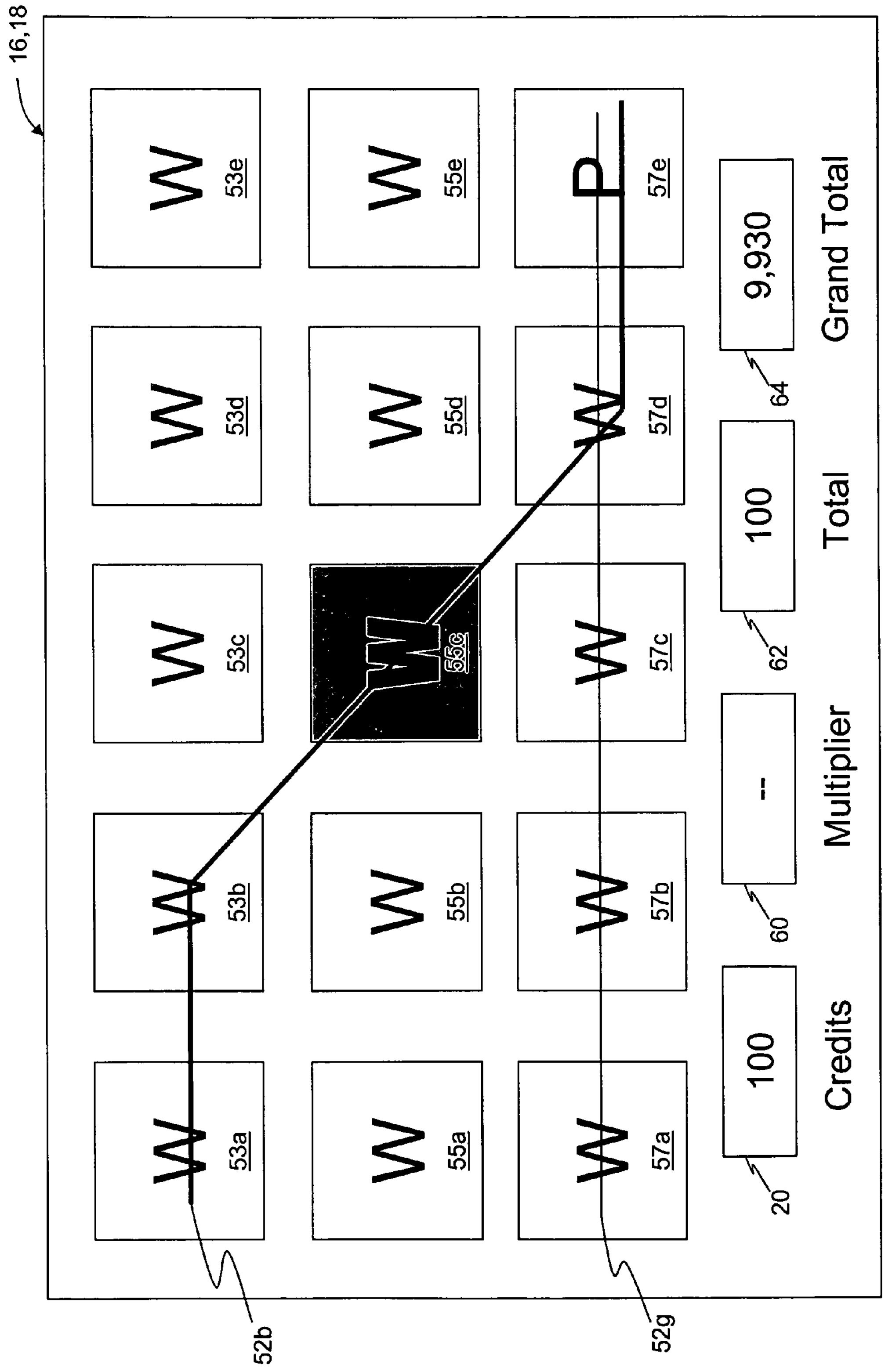

The wild symbol displayed in symbol position 55*a* along payline 52*d* is locked. As illustrated in FIGS. 16A and 16B, the "O" symbol displayed in symbol position 55*c* along payline 52*d* is replaced by a wild symbol. As a result, payline 52*b* and 52*g* each include winning combinations of symbols. Both winning combinations include the "P" symbol displayed in symbol position 57*e*. However, only the winning combination along payline 52*b* includes the new wild symbol displayed in symbol position 55*c*. A winning combination of "P" symbols corresponds to an award of one hundred credits according to the pay table illustrated in FIG. 3B. The one hundred credits provided to the player for the winning combination along payline 52*b* is multiplied by a multiplier that is increased from 20× to 25× to provide the player a total award of two thousand five hundred credits. The two thousand five hundred credits is added to the previous grand total number of credits to provide the player a grand total of nine thousand eight hundred thirty credits.

In an embodiment, the player receives awards associated with winning combinations of symbols generated along active paylines that do not include a new wild symbol. In an embodiment an award is provided to a player for any winning combination of symbols displayed in symbol positions along paylines on which the player has wagered. Alternatively, the gaming device can provide the player an award for any winning combination of symbols along any payline regardless of whether the player has wagered on the payline. For example, in FIG. 16B, a winning combination occurs along payline 52*g*. The winning combination includes a "P" symbol. An award of one hundred credits can be provided to the player even though a new wild symbol is not associated with the winning combination along that payline. However, each of the wild symbols included in the winning combination displayed along payline 52*g* were previously generated and do not cause a triggering event to occur in this embodiment. Therefore, the award of one hundred credits corresponding to the winning combination including a "P" symbol is not modified in the illustrated embodiment. Accordingly, one hundred credits is added to the grand total number of credits to provide the player a grand total of nine thousand nine hundred thirty credits. It should be appreciated that any award provided to the player associated with any winning combinations of symbols along active paylines can be modified if a triggering event occurs.

Figure 17:
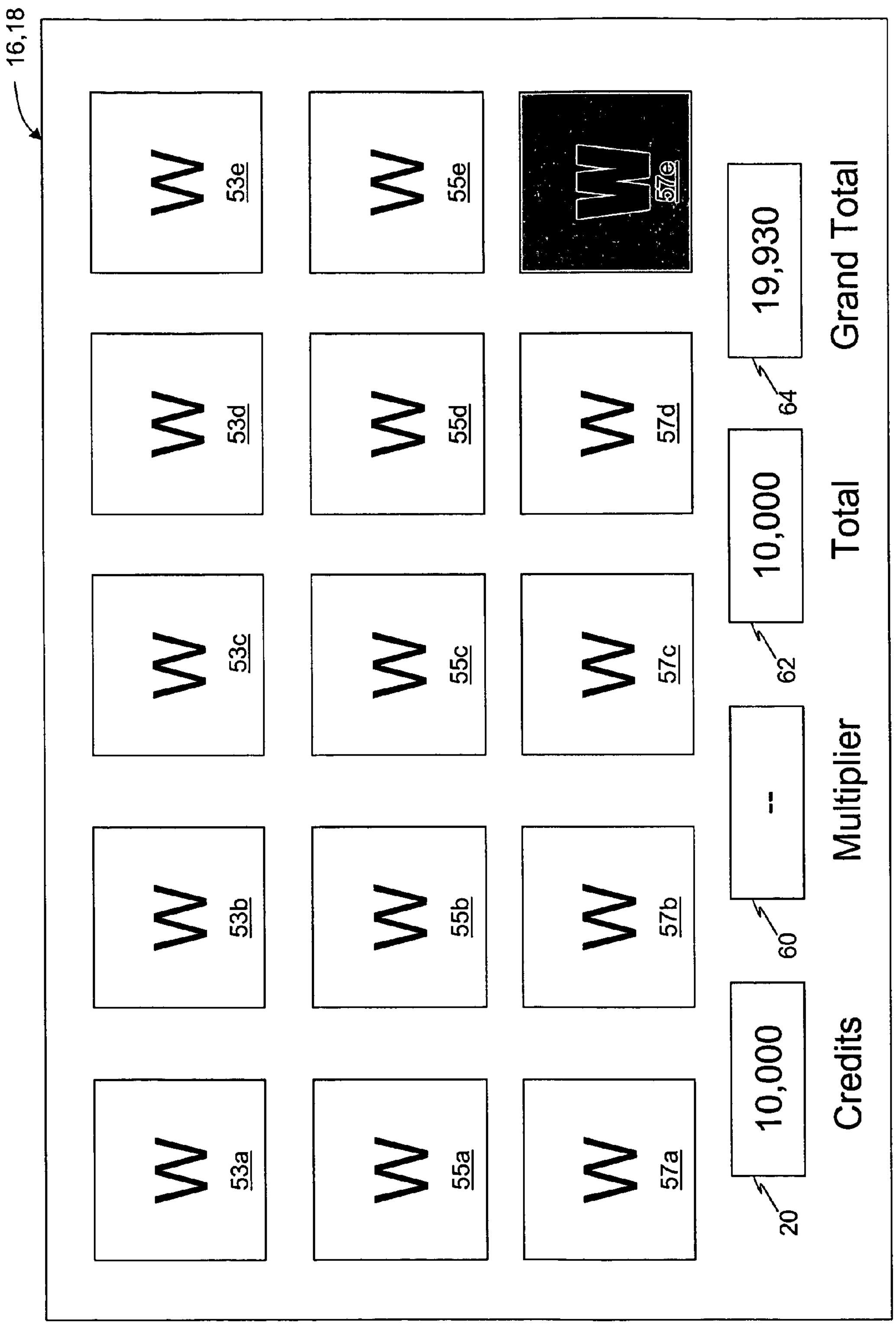

It should be appreciated that locking or fixing the designated symbol and replacing symbols continues to create a symbol cascading effect until all of the replaced symbols are designated symbols or until a designated symbol is not generated. As illustrated in FIG. 17, the "P" symbol displayed in symbol position 57*e* is the only symbol displayed in a winning combination along a payline associated with a new wild symbol. Therefore, the "P" symbol is replaced with a randomly generated symbol. As illustrated in FIG. 17, the "P" symbol displayed in symbol position 57*e* is replaced with a wild symbol.

In an embodiment, when all of the symbols have been replaced with wild symbols, a bonus award is provided to the player. In the embodiment illustrated in FIG. 17, the player is provided an award of ten thousand credits. The ten thousand credits are added to the previous grand total number of credits to provide the player a grand total of nineteen thousand nine hundred thirty credits.

Figure 18A:
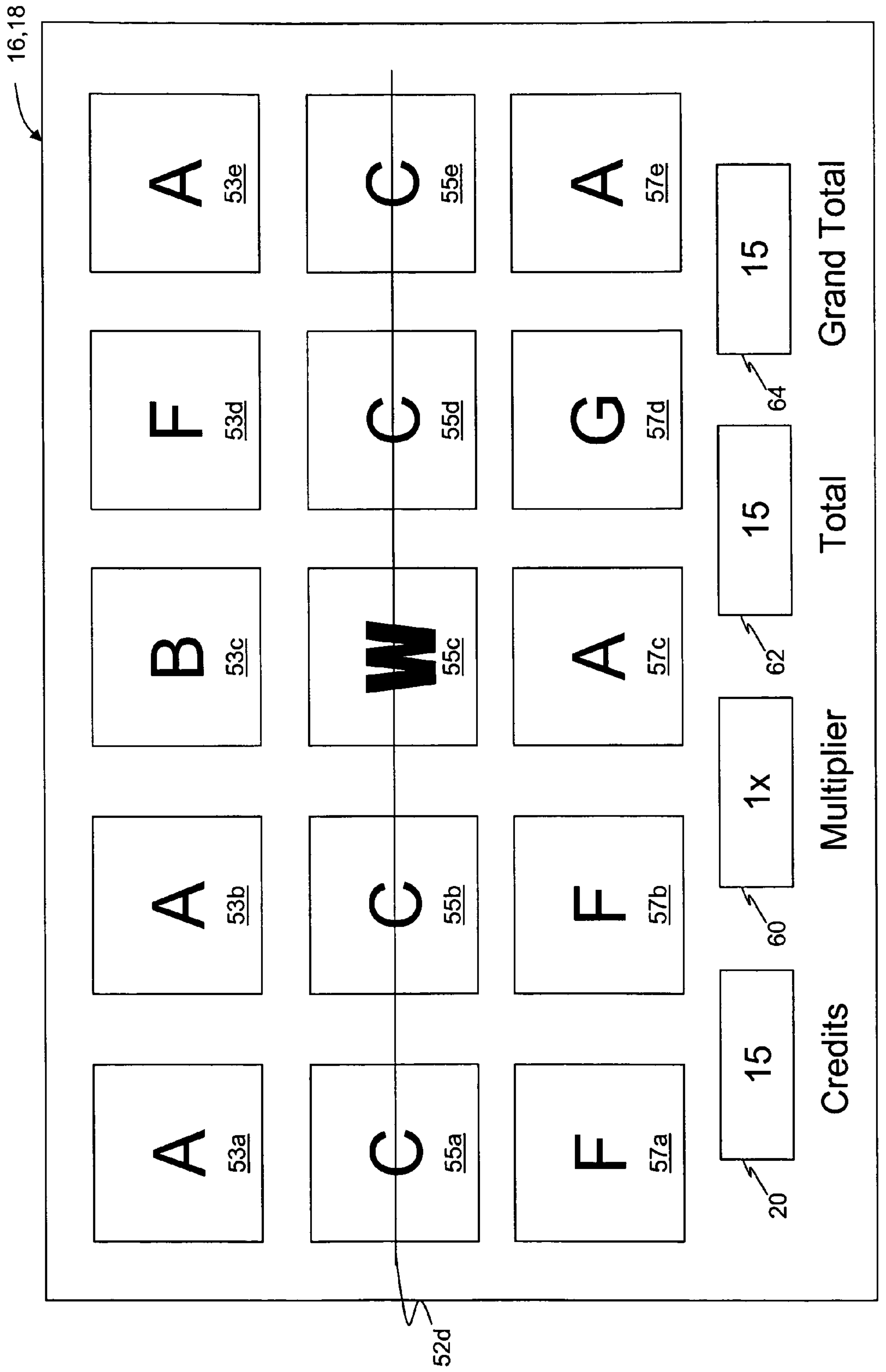
FIGS. 18A and 18B are elevation views of a display device illustrating an additional feature of an embodiment of the gaming device.
Figure 18B:
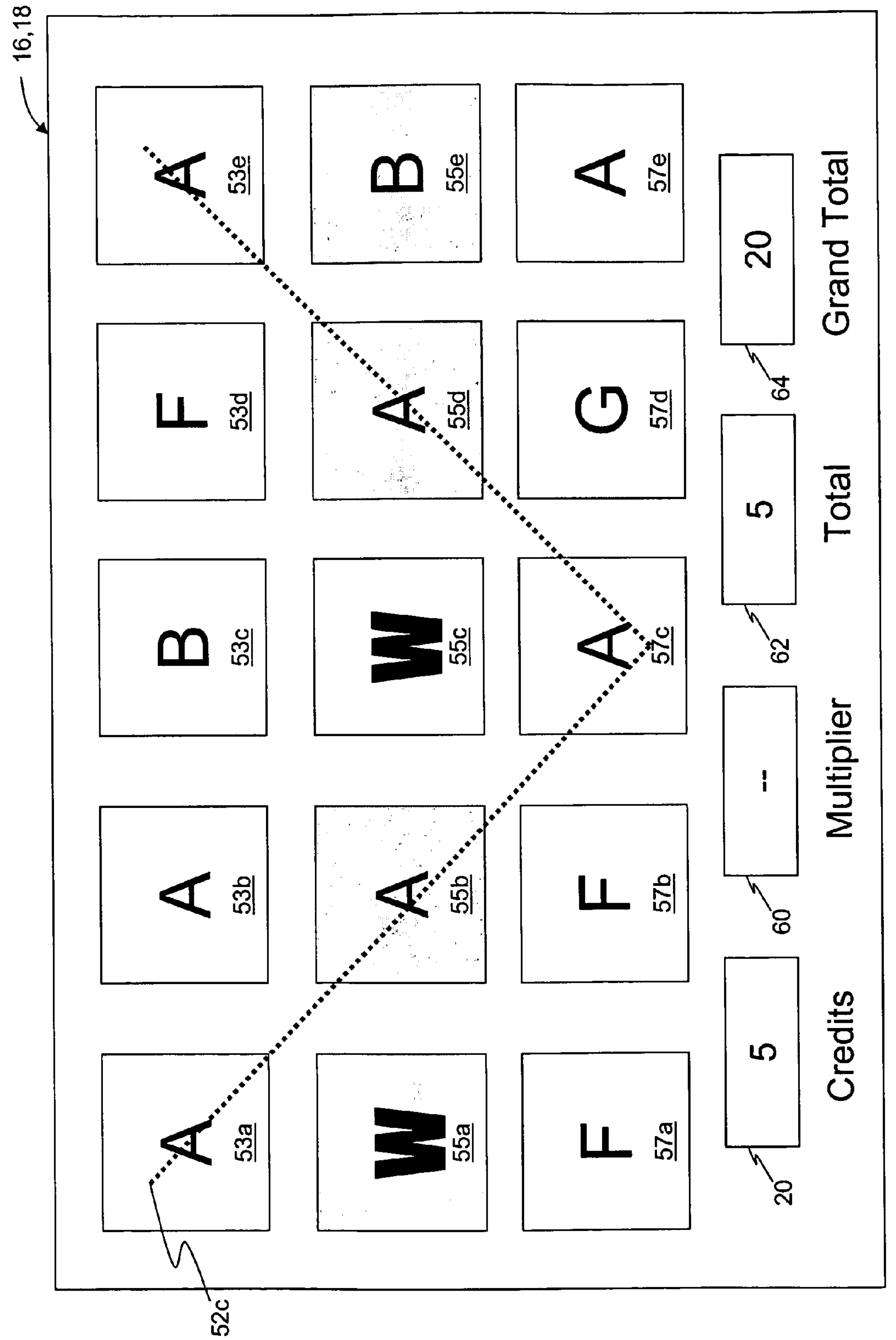

In an embodiment, the game ends if a wild symbol is not displayed in one of the symbol positions of a simultaneously generated and displayed winning combination of symbols displayed on the payline running through the wild symbol. As illustrated in FIGS. 18A and 18B, a wild symbol is generated at symbol position 55*c*. A winning combination of "C" symbols is displayed along payline 52*d*. The payline also includes the wild symbol displayed at symbol position 55*c*. The combination of the winning combination and the wild symbol displayed in symbol positions along the same activated payline acts as a triggering event to replace the non-wild symbols along that payline. Therefore, the "C" symbol displayed in symbol position 55*a* is replaced with the wild symbol as illustrated in FIG. 18B. The "C" symbol displayed in symbol position 55*b* is replaced with an "A" symbol. The "C" symbol displayed in symbol position 55*d* is replaced with an "A" symbol and the "C" symbol displayed in symbol position 55*e* is replaced with a "B" symbol.

As illustrated in FIG. 18B, a winning combination of "A" symbols is displayed in symbol positions along payline 52*c*. However, the winning combination does not include a new wild symbol generated in a symbol position associated with the payline. A new wild symbol, however, is generated and displayed in symbol position 55*a*. In an embodiment, if the generation of a designated symbol does not fulfill a condition of the triggering event, the designated symbol is not locked. Alternatively, the generation of a designated symbol is locked whether or not it fulfills a condition of the triggering event. Although a new wild symbol is generated and displayed in symbol position 55*a*, there is no winning combination of symbols displayed in symbol positions associated with a payline that includes the wild symbol displayed in symbol position 55*a* as required to fulfill the conditions of the triggering event in the illustrated embodiment. Therefore, in the embodiment illustrated in FIGS. 18A and 18B, the game ends.

Figure 19A:
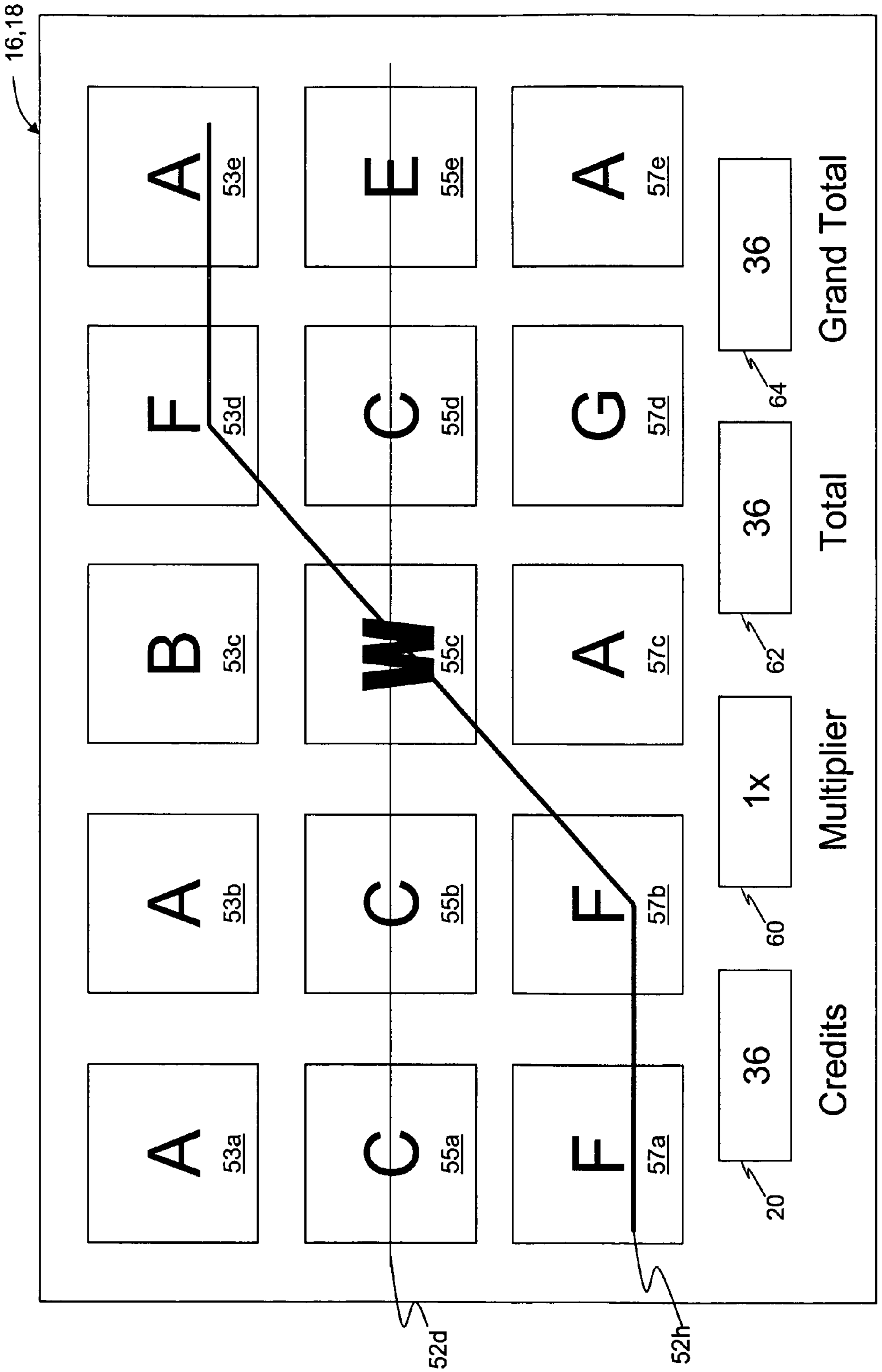
FIGS. 19A and 19B are elevation views of a display device illustrating an embodiment of the gaming device.
Figure 19B:
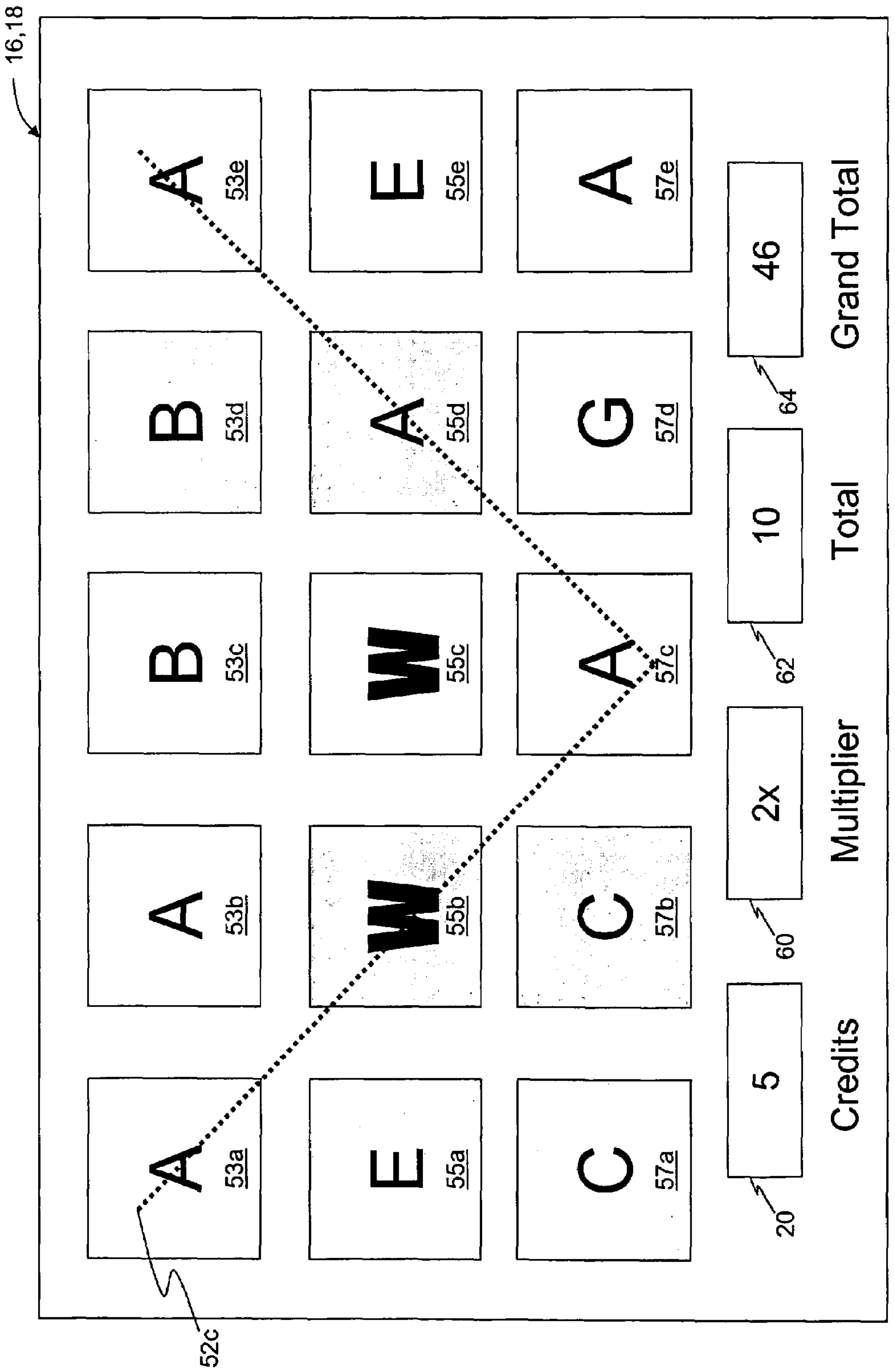

In an embodiment, illustrated in FIGS. 19A and 19B, a winning combination can include less than all of the symbols displayed in associated symbol positions. For example, in FIG. 19A, winning combinations of four "C" symbols and four "F" symbols are generated and displayed in the five associated symbol positions along payline 52*d* and 52*h*, respectively. Specifically, along payline 52*d*, a "C" symbol is generated and displayed in symbol position 55*a*; a "C" symbol is generated and displayed in symbol position 55*b*; a wild symbol is generated and displayed in symbol position 55*c*; a "C" symbol is generated and displayed in symbol position 55*d*; and an "E" symbol is generated and displayed in symbol position 55*e*. Similarly, along payline 52*h*, an "F" symbol is generated and displayed in symbol position 57*a*; an "F" symbol is generated and displayed in symbol position 57*b*; a wild symbol is generated and displayed in symbol position 55*c*, as described above; an "F" symbol is generated and displayed in symbol position 53*d*; and an "A" symbol is generated and displayed in symbol position 53*e*. In the illustrated embodiment, four "C" symbols correspond to an award of twelve credits (not shown), and four "F" symbols correspond to an award of twenty-four credits (not shown) to provide the player a combined award of thirty-six credits for the two winning combinations as indicated in the credits display 20 illustrated in FIG. 19A. Assuming this is the first triggering event to occur in the game, the 1× multiplier is used to modify the award to provide the player a total and grand total award of thirty-six credits.

In the illustrated embodiment, a triggering event occurs when a wild symbol is generated in at least one winning combination along an activated payline. Therefore, the wild symbol is locked or fixed to remain displayed in symbol position 55*c* and, each of the "C" symbols and the "F" symbols in the winning combinations are replaced with generated symbols. In FIG. 19B, three of the five symbols displayed in associated symbol positions, as indicated by the symbol positions along payline 52*d*, are replaced. Specifically, the "C" symbol displayed in symbol position 55*a* is replaced with an "E" symbol; the "C" symbol displayed in symbol position 55*b* is replaced with a wild symbol; the wild symbol displayed in symbol position 55*c* remains displayed in symbol position 55*c*; and the "C" symbol displayed in symbol position 55*d* is replaced with an "A" symbol. Although the "E" symbol is generated and displayed in a symbol position along the same payline 52*d*, the "E" symbol is not included in the winning combination of symbols and is, therefore, not replaced in this embodiment. It should be appreciated, however, that in an alternative embodiment, each symbol displayed in symbol positions along an activated payline that includes a winning combination of symbols and that is part of a triggering event is replaced, whether or not the symbols are part of the winning combination.

Similarly, in FIG. 19B, three of the five symbols displayed in associated symbol positions, as indicated by the symbol positions along payline 52*h*, are replaced. Specifically, the "F" symbol displayed in symbol position 57*a* is replaced with a "C" symbol; the "F" symbol displayed in symbol position 57*b* is replaced with a "C" symbol; the wild symbol displayed in symbol position 55*c* remains displayed in symbol position 55*c*; and the "F" symbol displayed in symbol position 53*d* is replaced with a "B" symbol. Although the "A" symbol is generated and displayed in a symbol position along the same payline 52*h*, the "A" symbol is not included in the winning combination of symbols and is, therefore, not replaced in this embodiment.

As illustrated in FIG. 19B, a winning combination of four "A" symbols and a wild symbol are displayed in symbol positions along payline 52*c*. According to the paytable illustrated in FIG. 3B, five "A" symbols correspond to an award of five credits to provide the player an award of five credits for the winning combination as indicated in the credits display 20 illustrated in FIG. 19B. Assuming this is the second triggering event to occur in the game, according to FIG. 3C, the 2× multiplier is used to modify the award to provide the player a total of ten credits. These ten credits are then added to the thirty-six credits from the previous generation of symbols to provide the player a grand total award of forty-six credits as indicated in the grand total award display 64.

It should be appreciated that, the embodiment illustrated in FIG. 19B includes each condition of another triggering event wherein a wild symbol is generated along with a winning combination of symbols displayed in symbol positions along payline 52*c*. Therefore, the game continues to replace symbols of winning combinations until a triggering event does not occur or until all the symbol positions display a wild symbol as illustrated in FIG. 17.

Figure 20A:
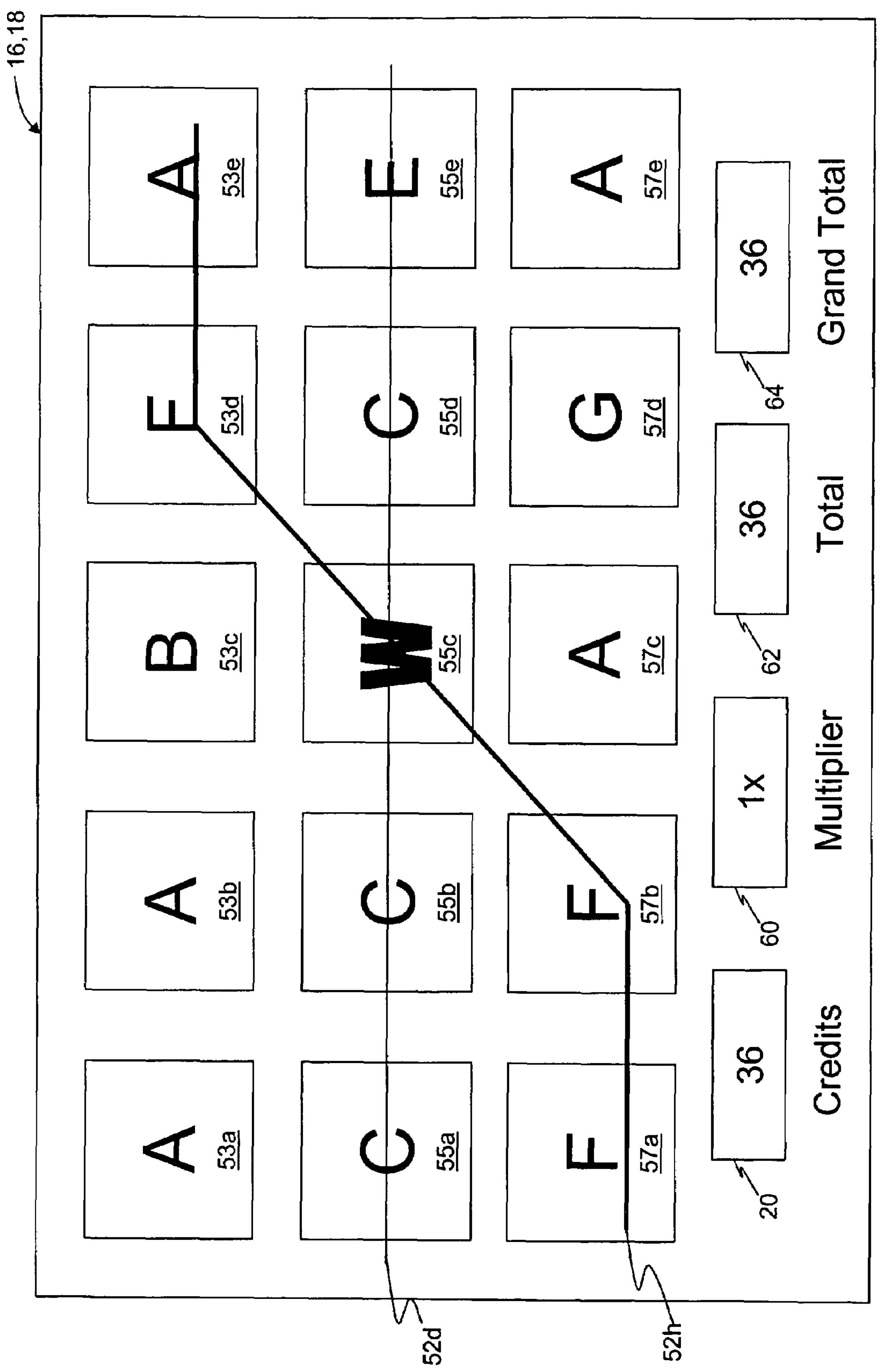
FIGS. 20A and 20B are elevation views of a display device illustrating an embodiment of the gaming device.
Figure 20B:
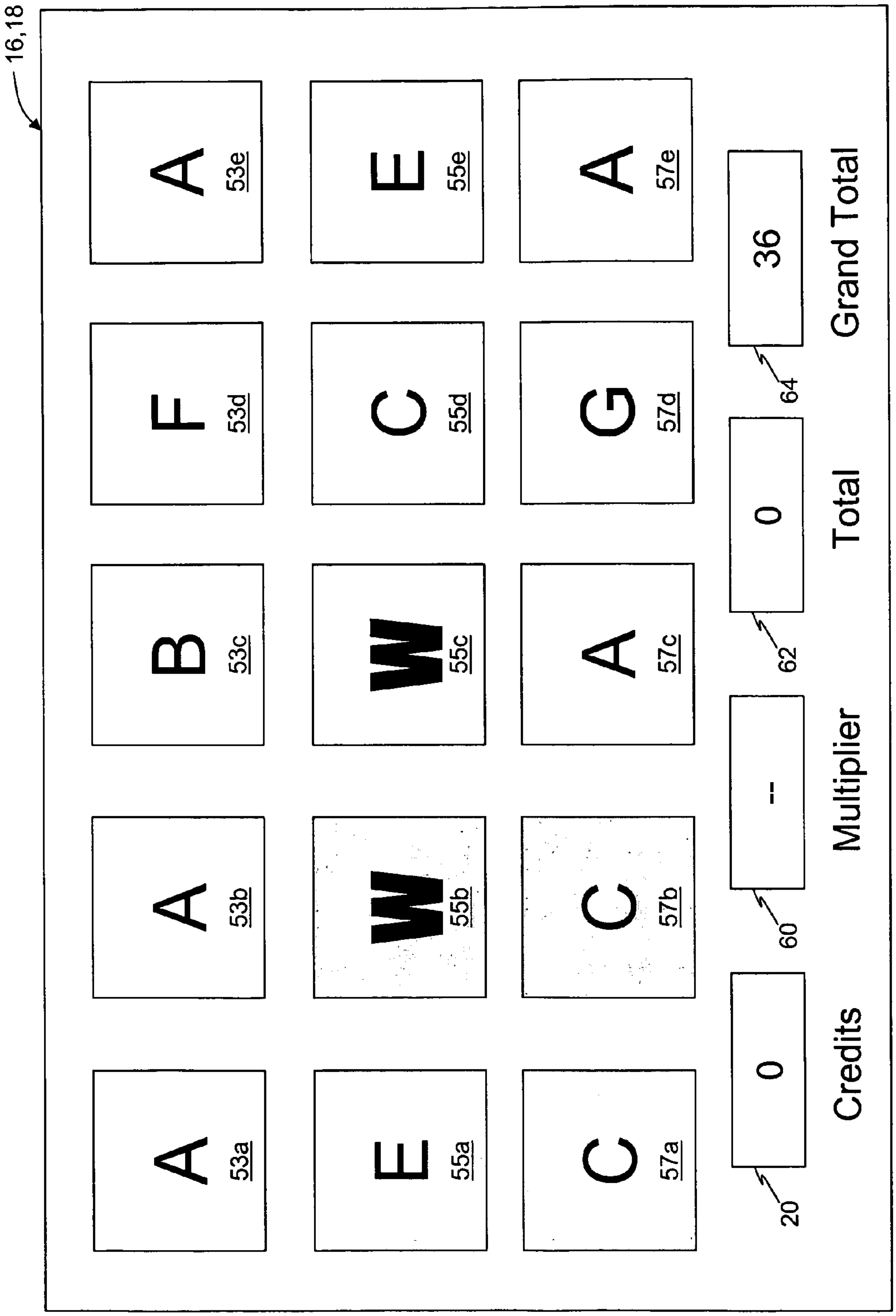

In an alternative embodiment, as illustrated in FIGS. 20A and 20B, only certain symbols of a winning combination displayed in associated symbol positions are replaced. For example, similar to FIG. 19A, in FIG. 20A, a triggering event occurs when a wild symbol is generated in the two winning combinations along paylines 52*d* and 52*h*. As in the embodiment, illustrated in FIGS. 19A and 19B, the wild symbol is fixed to be displayed in symbol position 55*c*.

In the embodiment illustrated in FIGS. 20A and 20B, however, only symbols of a winning combination displayed in symbol positions having a particular relationship to the symbol position displaying the designated symbol are replaced.

For instance, in an embodiment, only symbols of a winning combination displayed in symbol positions having a particular spatial relationship such as any one of the symbol positions immediately adjacent to the symbol position displaying the designated symbol are replaced. In another embodiment, for example, only symbols of a winning combination displayed in symbol positions having a particular spatial relationship such as any one of the symbol positions to the right of, to the left of, above, below and/or diagonal to the symbol position displaying the designated symbol are replaced.

As illustrated in FIG. 20B, the "C" symbols and the "F" of the winning combinations of symbols generated and displayed in symbol positions to the left of the wild symbol generated and displayed in symbol position 55*c* are replaced with generated symbols. Therefore, in FIG. 20B, two of the five symbols displayed in symbol positions, as indicated by the symbol positions along payline 52*d*, are replaced. Specifically, the "C" symbol displayed in symbol position 55*a* is replaced with an "E" symbol, and the "C" symbol displayed in symbol position 55*b* is replaced with a wild symbol. Although the "C" symbol generated and displayed in symbol position 55*d* is generated and displayed in a symbol position along the same payline 52*d* and is included in the winning combination of symbols, the "C" symbol is not generated and displayed in symbol positions to the left of the wild symbol and is, therefore, not replaced in this embodiment.

Likewise, in FIG. 20B, two of the five symbols displayed in associated symbol positions, as indicated by the symbol positions along payline 52*h*, are replaced. It should be appreciated that symbols generated and displayed in symbol positions to the right of, to the left of, above or below the symbol position generating and displaying a wild symbol can include symbol positions positioned or arranged at a diagonal to the right of, to the left of, above or below the wild symbol. For example, the "F" symbol displayed in symbol position 57*a* which is along payline 52*h* and which is diagonal and to the left of symbol position 55*c* displaying the generated wild symbol is replaced with a "C" symbol. The "F" symbol displayed in symbol position 57*b* which is along payline 52*h* and which is diagonal and to the left of symbol position 55*c* is replaced with a "C" symbol. Although the "F" symbol generated and displayed in symbol position 53*d* is generated and displayed in a symbol position along the same payline 52*h* and is included in the winning combination of symbols, the "F" symbol is not generated and displayed in symbol positions to the left of the wild symbol and is, therefore, not replaced in this embodiment.

In contrast to the play of the game illustrated in FIGS. 19A and 19B, the embodiment illustrated in FIG. 20B does not include each condition of another triggering event. Although a wild symbol is generated, a winning combination of symbols is not generated and displayed in symbol positions along a payline which includes the symbol position displaying the wild symbol. Therefore, in the illustrated embodiment, the game ends.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device operable under the control of a processor, said gaming device comprising:

a game controlled by the processor and operable upon a wager by a player;

an input device; and a display device for displaying a plurality of symbol positions;

wherein the processor is programmed to operate with the display device and the input device to:

(a) generate and display one of a plurality of symbols of said game in each of said plurality of symbol positions, the plurality of symbols including at least one designated symbol, (b) determine if a winning combination of said symbols is displayed in a plurality of associated symbol positions, (c) provide an award to the player for said winning combination of said symbols if said winning combination of said symbols is displayed in said plurality of associated symbol positions, (d) determine if a triggering event occurs, wherein said triggering event occurs if one of the designated symbols is displayed in one of said plurality of associated symbol positions and said winning combination of said symbols is displayed in said plurality of associated symbol positions, and (e) if the triggering event occurs, (i) lock the display of said designated symbol in the symbol position displaying said designated symbol, (ii) replace at least one of the symbols in the winning combination of said symbols with a random symbol from said plurality of symbols, and (iii) repeat (b) through (e) unless said designated symbol is displayed in each of said symbol positions, in which case repeat (b) through (c).

2. The gaming device of claim 1, wherein the at least one designated symbol includes a wild symbol.

3. The gaming device of claim 1, wherein the triggering event occurs if a plurality of said designated symbols are generated and displayed in said plurality of symbol positions, wherein at least one of said plurality of said designated symbols is displayed in said plurality of associated symbol positions.

4. The gaming device of claim 1, wherein the display device is adapted to display a plurality of reels, each reel including a plurality of symbol positions.

5. The gaming device of claim 1, wherein the display device is adapted to display a plurality of independent reels, each independent reel including a plurality of symbol positions.

6. The gaming device of claim 1, wherein said symbols in said plurality of symbol positions are randomly generated.

7. The gaming device of claim 1, wherein the winning combination of said symbols includes a symbol displayed in each of the associated symbol positions.

8. The gaming device of claim 1, wherein the winning combination of said symbols includes a symbol displayed in at least two of the associated symbol positions.

9. The gaming device of claim 1, wherein the plurality of associated symbol positions are arranged along a common payline.

10. The gaming device of claim 1, wherein the triggering event occurs if said designated symbol is displayed on a payline and the winning combination of said symbols occurs on said same payline.

11. The gaming device of claim 1, wherein for each occurrence of the triggering event, the probability of the triggering event recurring is increased.

12. The gaming device of claim 1, wherein the triggering event occurs if at least a first condition occurs and a second condition occurs, wherein an occurrence of the first condition increases the probability of an occurrence of the second condition.

13. The gaming device of claim 12, wherein the first condition occurs if one of the at least one of the designated symbols is generated and displayed.

14. The gaming device of claim 12, wherein the second condition occurs if a winning combination of said symbols is generated and displayed in a plurality of associated symbol positions.

15. The gaming device of claim 1, wherein if the triggering event occurs, the processor is programmed to operate with the display device to replace each of the symbols in the winning combination of said symbols with a random symbol from said plurality of symbols.

16. The gaming device of claim 1, wherein if the triggering event occurs, the processor is programmed to operate with the display device to replace at least one of the symbols in the winning combination of said symbols with a random symbol from said plurality of symbols if the symbol position displaying said symbol to be replaced is in a predetermined spatial relationship with the symbol position displaying the designated symbol.

17. The gaming device of claim 16, wherein the predetermined spatial relationship is selected from the group consisting of: immediately adjacent to, to the right of, to the left of, above, below, diagonal to, and combinations thereof.

18. The gaming device of claim 1, wherein the processor is programmed to operate with the display device to determine if a first triggering event occurs and to determine if a second triggering event occurs, and wherein any symbols replaced if the first triggering event occurs are replaced again if the second triggering event occurs.

19. The gaming device of claim 1, which includes providing at least one award to the player for each winning combination of said symbols generated and displayed in each of a plurality of a plurality of associated symbol positions.

20. The gaming device of claim 19, wherein the award provided to the player for each winning combination of said symbols displayed in each of the plurality of the plurality of associated symbol positions is modified if a triggering event occurs.

21. The gaming device of claim 20, wherein the award is modified by applying a multiplier.

22. The gaming device of claim 21, wherein the multiplier is increased for each occurrence of the triggering event.

23. A gaming device operable under the control of a processor, said gaming device comprising:

a game controlled by the processor and operable upon a wager by a player;

an input device; and a display device for displaying a plurality of symbol positions;

wherein the processor is programmed to operate with the display device and the input device to—

(a) generate and display one of a plurality of symbols of said game in each of said plurality of symbol positions, the plurality of symbols including at least one designated symbol, (b) determine if a winning combination of said symbols is displayed in a plurality of associated symbol positions, (c) provide an award to the player for said winning combination of said symbols if said winning combination of said symbols is displayed in said plurality of associated symbol positions, (d) determine if a triggering event occurs, wherein said triggering event occurs if a first condition and a second condition occur, said first condition occurring if one of the at least one designated symbols is displayed in at least one of said plurality of associated symbol positions and said second condition occurring if said winning combination of said symbols is displayed in said plurality of associated symbol positions, wherein an occurrence of the first condition increases a probability of an occurrence of the second condition, and (e) if the triggering event occurs, (i) lock the display of said designated symbol in the symbol position displaying said designated symbol, (ii) replace at least one of the symbols in the winning combination of said symbols with a random symbol from said plurality of symbols, and (iii) repeat (b) through (e) unless said designated symbol is displayed in each of said symbol positions, in which case repeat (b) through (c).

24. The gaming device of claim 23, wherein said at least one designated symbol includes a wild symbol.

25. The gaming device of claim 23, wherein the display device is adapted to display a plurality of independent reels, each independent reel including a plurality of symbol positions.

26. The gaming device of claim 23, wherein the winning combination of said symbols includes a symbol displayed in each of the associated symbol positions.

27. The gaming device of claim 23, wherein the winning combination of said symbols includes a symbol displayed in at least two of the associated symbol positions.

28. The gaming device of claim 23, wherein the plurality of associated symbol positions are arranged along a common payline.

29. The gaming device of claim 23, wherein the triggering event occurs if said designated symbol is displayed on a payline and the winning combination of said symbols occurs on said same payline.

30. The gaming device of claim 23, wherein the processor is programmed to operate with the display device to determine if a first triggering event occurs and to determine if a second triggering event occurs, and wherein any symbols replaced if the first triggering event occurs are replaced again if the second triggering event occurs.

31. The gaming device of claim 23, wherein for each occurrence of the triggering event, the probability of the triggering event recurring is increased.

32. The gaming device of claim 23, wherein if the triggering event occurs, the processor is programmed to operate with the display device to replace each of the symbols in the winning combination of said symbols with a random symbol from said plurality of symbols.

33. The gaming device of claim 23, wherein if the triggering event occurs, the processor is programmed to operate with the display device to replace at least one of the symbols in the winning combination of said symbols with a random symbol from said plurality of symbols if the symbol position displaying said symbol to be replaced is in a predetermined spatial relationship with the symbol position displaying the designated symbol.

34. The gaming device of claim 33, wherein the predetermined spatial relationship is selected from the group consisting of: immediately adjacent to, to the right of, to the left of, above, below, diagonal to, and combinations thereof.

35. The gaming device of claim 23, which includes providing at least one award to the player for each winning combination of said symbols generated and displayed in each of the plurality of associated symbol positions.

36. The gaming device of claim 35, wherein the award provided to the player for each winning combination of said symbols displayed in each of the plurality of associated symbol positions which satisfies the second condition of the triggering event is modified if the first condition of the triggering event is satisfied.

37. The gaming device of claim 36, wherein the award is modified by applying a multiplier, said multiplier being increased for each occurrence of the triggering event.

38. A method of operating a gaming device including a program, said method comprising:

(a) providing a game operable upon a wager by a player;

(b) generating and causing at least one display device to display a symbol from a plurality of symbols of said game in each of a plurality of symbol positions, wherein at least one of said plurality of symbols includes a designated symbol;

(c) causing a processor to execute said program to determine if a winning combination of said symbols is displayed in a plurality of associated symbol positions;

(d) providing an award to the player for said winning combination of said symbols if said winning combination of said symbols is displayed in said plurality of associated symbol positions;

(e) causing the processor to execute said program to determine if a triggering event occurs, wherein said triggering event occurs if at least a first condition occurs and a second condition occurs, said first condition occurring if at least one of the designated symbols is displayed in at least one of said plurality of associated symbol positions, and wherein-said second condition occurring if said winning combination of said symbols is displayed in said plurality of associated symbol positions; and if the triggering event is determined to occur, causing the processor to execute said program to:

i. lock the display of said designated symbol in the symbol position displaying said designated symbol, ii. replace at least one of the symbols in the winning combination of said symbols with a random symbol from said plurality of symbols, and iii. repeat (c) through (e) unless the designated symbol is displayed in each symbol position, in which case repeat (c) through (d).

39. The method of claim 38, wherein the at least one designated symbol includes a wild symbol.

40. The method of claim 38, wherein said first condition of the triggering event occurs if a plurality of said designated symbols are generated and displayed in said plurality of symbol positions, wherein at least one of said plurality of said designated symbols is displayed in said plurality of associated symbol positions.

41. The method of claim 38, which includes generating and displaying symbols in a plurality of symbol positions of a plurality of reels.

42. The method of claim 41, wherein the plurality of reels include a plurality of independent reels.

43. The method of claim 38, which includes randomly generating a symbol from said plurality of symbols for each of said plurality of symbol positions.

44. The method of claim 38, wherein the winning combination of said symbols includes a symbol displayed in each of the associated symbol positions.

45. The method of claim 38, wherein the winning combination of said symbols includes a symbol displayed in at least one of the associated symbol positions.

46. The method of claim 38, wherein the plurality of associated symbol positions are arranged along a common payline.

47. The method of claim 38, wherein the plurality of associated symbol positions include at least one symbol position adjacent to a symbol position displaying one of the designated symbols.

48. The method of claim 38, wherein the triggering event occurs if the designated symbol and the winning combination of said symbols are displayed along the same payline.

49. The method of claim 38, which includes a probability of an occurrence of the first condition of the triggering event and a probability of an occurrence of the second condition of the triggering event.

50. The method of claim 49, wherein an occurrence of the first condition of the triggering event increases said probability of an occurrence of the second condition of the triggering event.

51. The method of claim 38, which includes increasing a probability of a second occurrence of the triggering event after a first occurrence of the triggering event.

52. The method of claim 38, which includes, if the triggering event occurs, replacing each of the symbols of the winning combination of said symbols with a random symbol from said plurality of symbols.

53. The method of claim 38, which includes, if the triggering event occurs, replacing at least one of the symbols of the winning combination of said symbols with a random symbol from said plurality of symbols if the symbol position displaying said at least one symbol to be replaced is in a predetermined spatial relationship with the symbol position displaying the at least one designated symbol.

54. The method of claim 53, wherein the spatial relationship is selected from the group consisting of: adjacent to, to the right of, to the left of, above, below, diagonal to, and combinations thereof.

55. The method of claim 38, which includes continuing to replace any symbols replaced for a first occurrence of said triggering event upon a second occurrence of said second triggering event.

56. The method of claim 38, which includes providing at least one award to the player for each winning combination of said symbols generated and displayed in each of a plurality of a plurality of associated symbol positions.

57. The method of claim 56, which includes modifying the award provided to the player for the winning combination of said symbols displayed in each of the plurality of the plurality of associated symbol positions upon the occurrence of the triggering event.

58. The method of claim 57, which includes modifying the award provided to the player by applying a multiplier.

59. The method of claim 58, which includes increasing the multiplier for each occurrence of the triggering event.

* * * * *